US012738501B2

(12) United States Patent
Ito et al.

(10) Patent No.: US 12,738,501 B2
(45) Date of Patent: Sep. 15, 2026

(54) BINDER COMPOSITION FOR NON-AQUEOUS SECONDARY BATTERY ELECTRODE, SLURRY COMPOSITION FOR NON-AQUEOUS SECONDARY BATTERY ELECTRODE, ELECTRODE FOR NON-AQUEOUS SECONDARY BATTERY, AND NON-AQUEOUS SECONDARY BATTERY

(71) Applicant: ZEON CORPORATION, Tokyo (JP)

(72) Inventors: Yukie Ito, Tokyo (JP); Tsutomu Fujii, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 892 days.

(21) Appl. No.: 17/757,242

(22) PCT Filed: Dec. 16, 2020

(86) PCT No.: PCT/JP2020/047013
§ 371 (c)(1),
(2) Date: Jun. 13, 2022

(87) PCT Pub. No.: WO2021/131980
PCT Pub. Date: Jul. 1, 2021

(65) Prior Publication Data

US 2023/0006210 A1 Jan. 5, 2023

(30) Foreign Application Priority Data

Dec. 27, 2019 (JP) ................................ 2019-239649

(51) Int. Cl.

| | |
|---|---|
| ***H01M 4/62*** | (2006.01) |
| ***C08F 220/56*** | (2006.01) |
| ***C08L 33/08*** | (2006.01) |
| ***C08L 33/20*** | (2006.01) |
| ***C08L 33/26*** | (2006.01) |
| *C08F 220/14* | (2006.01) |
| *C08F 220/44* | (2006.01) |
| *H01M 4/13* | (2010.01) |
| *H01M 4/139* | (2010.01) |

(52) U.S. Cl.
CPC .......... *H01M 4/622* (2013.01); *C08F 220/56* (2013.01); *C08L 33/08* (2013.01); *C08L 33/20* (2013.01); *C08L 33/26* (2013.01); *C08F 220/14* (2013.01); *C08F 220/44* (2013.01); *H01M 4/13* (2013.01); *H01M 4/139* (2013.01); *H01M 4/621* (2013.01); *H01M 4/625* (2013.01); *Y02E 60/10* (2013.01)

(58) Field of Classification Search
CPC ........ H01M 4/622; H01M 4/625; H01M 4/13; H01M 4/139; H01M 4/621; C08L 33/08; C08L 33/064; C08L 33/20; C08L 33/18; C08L 33/24; C08L 25/12; C08L 33/26; C08F 220/14; C08F 220/44; C08F 220/10; C08F 220/42; C08F 8/04; C08F 212/08; C08F 220/56; Y02E 60/10
See application file for complete search history.

(56) References Cited

U.S. PATENT DOCUMENTS

| | | | | |
|---|---|---|---|---|
| 2005/0069769 A1 | | 3/2005 | Nakayama et al. | |
| 2013/0280606 A1* | | 10/2013 | Sekine | C08L 9/02 429/211 |
| 2015/0357648 A1* | | 12/2015 | Sugimoto | H01M 4/622 429/217 |
| 2016/0118665 A1 | | 4/2016 | Sekine | |
| 2017/0309889 A1* | | 10/2017 | Masuda | C08F 2/44 |
| 2018/0114976 A1* | | 4/2018 | Lee | H01M 10/0525 |

FOREIGN PATENT DOCUMENTS

| | | | |
|---|---|---|---|
| CN | 108321360 | A | 7/2018 |
| CN | 109841835 | A | 6/2019 |
| JP | 2003132893 | A | 5/2003 |
| JP | 4200349 | B2 | 12/2008 |
| JP | 2015213049 | A | 11/2015 |
| JP | 2017016890 | A | 1/2017 |
| KR | 1020130143617 | A | 12/2013 |
| KR | 1020180044746 | A | 5/2018 |

OTHER PUBLICATIONS

Jun. 28, 2022, International Preliminary Report on Patentability issued in the International Patent Application No. PCT/JP2020/047013.

Dec. 22, 2023, the Extended European Search Report issued by the European Patent Office in the corresponding European Patent Application No. 20907315.4.

* cited by examiner

*Primary Examiner* — Christian Roldan
*Assistant Examiner* — Katherine J Metzger
(74) *Attorney, Agent, or Firm* — KENJA IP LAW PC

(57) ABSTRACT

A binder composition for a non-aqueous secondary battery electrode contains a specific binder component, a plasticizer, and an organic solvent. The binder component includes an insoluble polymer that includes a (meth)acrylic acid ester monomer unit and an ethylenically unsaturated acid monomer unit and a highly soluble polymer that includes, in specific content ratios, a nitrile group-containing monomer unit and either or both of an amide group-containing monomer unit and a (meth)acrylic acid ester monomer unit having an alkyl chain carbon number of not less than 1 and not more than 6.

13 Claims, No Drawings

BINDER COMPOSITION FOR NON-AQUEOUS SECONDARY BATTERY ELECTRODE, SLURRY COMPOSITION FOR NON-AQUEOUS SECONDARY BATTERY ELECTRODE, ELECTRODE FOR NON-AQUEOUS SECONDARY BATTERY, AND NON-AQUEOUS SECONDARY BATTERY

TECHNICAL FIELD

The present disclosure relates to a binder composition for a non-aqueous secondary battery electrode, a slurry composition for a non-aqueous secondary battery electrode, an electrode for a non-aqueous secondary battery, and a non-aqueous secondary battery.

BACKGROUND

Non-aqueous secondary batteries such as lithium ion secondary batteries have characteristics such as compact size, light weight, high energy density, and the ability to be repeatedly charged and discharged, and are used in a wide variety of applications.

Consequently, in recent years, studies have been made to improve battery members such as electrodes for the purpose of achieving even higher non-aqueous secondary battery performance.

An electrode used in a non-aqueous secondary battery (hereinafter, also referred to simply as a "secondary battery") such as a lithium ion secondary battery typically includes a current collector and an electrode mixed material layer (positive electrode mixed material layer or negative electrode mixed material layer) formed on the current collector. This electrode mixed material layer is formed by, for example, applying a slurry composition containing an electrode active material, a binder-containing binder composition, and so forth onto the current collector, and then drying the applied slurry composition.

In recent years, attempts have been made to improve slurry compositions used in the formation of electrode mixed material layers in order to further improve secondary battery performance.

As one example, Patent Literature (PTL) 1 discloses that a plasticizer for improving flexibility of an electrode can be added to a binder resin for a secondary battery electrode containing a polymer that includes 50 mol % to 99.99 mol % of vinyl cyanide units and 0.01 mol % to 10 mol % of acidic group-containing units as constitutional units and that has a mass-average molecular weight of not less than 200,000 and not more than 2,000,000.

As another example, PTL 2 discloses that a plasticizer for improving flexibility of an electrode can be added to a binder resin for a non-aqueous secondary battery electrode containing a polymer that includes an acidic group and a polymer that has a vinyl cyanide monomer unit-containing polymer grafted as a branch polymer to a polyolefin backbone polymer.

As yet another example, PTL 3 and 4 propose that polyvinylidene fluoride serving as a binder and a plasticizer are used in combination in production of a slurry for a positive electrode or a paste for a positive electrode.

CITATION LIST

Patent Literature

PTL 1: JP2015-213049A
PTL 2: JP2017-16890A
PTL 3: CN109841835A
PTL 4: CN108321360A

SUMMARY

Technical Problem

In recent years, there has been demand for further enhancing battery characteristics such as rate characteristics and cycle characteristics (hereinafter, also referred to simply as "battery characteristics") of secondary batteries. In order to produce a secondary battery having excellent battery characteristics, it is important that a used electrode displays high flexibility and uniformity.

However, with the conventional binder resin, slurry for a positive electrode, and paste for a positive electrode described above, it has not been possible to simultaneously achieve, to high levels, both the formation of an electrode having excellent flexibility and uniformity and the enhancement of rate characteristics and cycle characteristics of a secondary battery including the obtained electrode.

Accordingly, one object of the present disclosure is to provide a binder composition for a non-aqueous secondary battery electrode and a slurry composition for a non-aqueous secondary battery electrode with which it is possible to simultaneously achieve, to high levels, both the formation of an electrode having excellent flexibility and uniformity and the enhancement of rate characteristics and cycle characteristics of a secondary battery including the obtained electrode.

Another object of the present disclosure is to provide an electrode for a non-aqueous secondary battery that has excellent flexibility and uniformity and that can enhance the rate characteristics and cycle characteristics of a secondary battery.

Yet another object of the present disclosure is to provide a non-aqueous secondary battery that has excellent rate characteristics and cycle characteristics.

Solution to Problem

The inventors conducted diligent investigation with the aim of solving the problem set forth above. The inventors discovered that the problem set forth above can advantageously be solved by using a binder composition for a non-aqueous secondary battery electrode that contains a binder component including two polymers satisfying specific chemical compositions, a plasticizer, and an organic solvent, and, in this manner, the inventors completed the present disclosure.

Specifically, the present disclosure aims to advantageously solve the problem set forth above, and a presently disclosed binder composition for a non-aqueous secondary battery electrode comprises: a polymer $\alpha$ and a polymer $\beta$ as a binder component; a plasticizer; and an organic solvent, wherein the polymer $\alpha$ is an insoluble polymer that includes a (meth)acrylic acid ester monomer unit and an ethylenically unsaturated acid monomer unit, and the polymer $\beta$ is a highly soluble polymer that includes a nitrile group-containing monomer unit and either or both of an amide group-containing monomer unit and a (meth)acrylic acid ester monomer unit having an alkyl chain carbon number of not less than 1 and not more than 6, wherein proportional content of the nitrile group-containing monomer unit is not less than 70 mass % and not more than 95 mass % and total proportional content of the amide group-containing monomer unit and the (meth)acrylic acid ester monomer unit is not less than 0.1 mass % and not more than 20 mass % when all monomer units forming the polymer β are taken to be 100 mass %, in total. Through a binder composition that contains the polymers α and β and a plasticizer in this manner, it is possible to simultaneously achieve, to high levels, both the formation of an electrode having excellent flexibility and uniformity and the enhancement of rate characteristics and cycle characteristics of a secondary battery including the obtained electrode.

In the present specification, "(meth)acryl" is used to indicate "acryl" or "methacryl". Note that the types of monomer units included in a given polymer and the "proportion of a monomer unit" in a given polymer can be identified and measured by a nuclear magnetic resonance (NMR) method such as $^1$H-NMR. Also note that the phrase "includes a monomer unit" means that "a polymer obtained with the monomer includes a repeating unit derived from the monomer". Moreover, a given polymer can be judged to be "insoluble" or "highly soluble" by a method described in the EXAMPLES section.

In the presently disclosed binder composition for a non-aqueous secondary battery electrode, when total mass of the binder component is taken to be 100 mass %, a content ratio (a) of the polymer α is preferably not less than 5 mass % and not more than 60 mass % and a content ratio (b) of the polymer β is preferably not less than 20 mass % and not more than 94 mass %. When the content ratios of the polymers α and β are within the ranges set forth above, the peel strength of an obtained electrode can be increased, and the cycle characteristics of an obtained secondary battery can be further enhanced.

In the presently disclosed binder composition for a non-aqueous secondary battery electrode, the polymer α and the polymer β are preferably polymers satisfying a condition that, in a situation in which an N-methyl-2-pyrrolidone mixture of 8 mass % in solid content concentration is produced such as to contain, as solid content, the polymer α in the content ratio (a) and the polymer β in the content ratio (b), a proportion of insoluble content in the mixture is not less than 30 mass % and not more than 80 mass %. When the amount of insoluble content with respect to N-methyl-2-pyrrolidone in a mixture of the polymers α and β is within the range set forth above, the peel strength of an obtained electrode can be increased, and the cycle characteristics of an obtained secondary battery can be further enhanced.

Note that the "proportion of insoluble content" referred to above can be measured by a method described in the EXAMPLES section.

In the presently disclosed binder composition for a non-aqueous secondary battery electrode, a content ratio of the plasticizer is preferably not less than 0.1 mass % and not more than 30 mass % when total mass of the plasticizer and the binder component is taken to be 100 mass %. When the content ratio of the plasticizer relative to the total mass of the binder component is not less than the lower limit set forth above, the flexibility of an obtained electrode can be further increased. Moreover, when the content ratio of the plasticizer is not more than the upper limit set forth above, the peel strength of an obtained electrode can be increased, and the cycle characteristics of a secondary battery including the electrode can be further enhanced.

In the presently disclosed binder composition for a non-aqueous secondary battery electrode, the plasticizer preferably has a molecular weight of 1,000 or less and a decomposition potential of 3.5 V or higher. When the plasticizer has a molecular weight of 1,000 or less and a decomposition potential of 3.5 V or higher, the flexibility of an obtained electrode can be further increased, and the rate characteristics and cycle characteristics of an obtained secondary battery can be further enhanced.

Note that the molecular weight and decomposition potential of a plasticizer can be measured by methods described in the EXAMPLES section.

The presently disclosed binder composition for a non-aqueous secondary battery electrode preferably further comprises, as the binder component, a polymer γ that is a highly soluble polymer having an iodine value of not less than 5 g/100 g and not more than 100 g/100 g. When a polymer γ that is a highly soluble polymer having an iodine value within the range set forth above is further included as the binder component, the flexibility and uniformity of an obtained electrode can be further increased. In addition, the peel strength of an obtained electrode can be increased when the polymer γ is included as the binder component.

Note that the "iodine value" of the polymer γ can be measured by a method described in the EXAMPLES section.

In the presently disclosed binder composition for a non-aqueous secondary battery electrode, a content ratio (c) of the polymer γ is preferably not less than 0.1 mass % and not more than 50 mass % when content of the binder component is taken to be 100 mass %. When the content ratio of the polymer γ among the binder component is within the range set forth above, the flexibility and uniformity of an obtained electrode can be further increased.

Moreover, the present disclosure aims to advantageously solve the problem set forth above, and a presently disclosed slurry composition for a non-aqueous secondary battery electrode comprises: any one of the binder compositions for a non-aqueous secondary battery electrode set forth above; an electrode active material; and a conductive material. Through a slurry composition that, in this manner, contains an electrode active material, a conductive material, and the binder composition for a non-aqueous secondary battery electrode set forth above that contains a binder component including two polymers satisfying specific chemical compositions, a plasticizer, and an organic solvent, it is possible to simultaneously achieve, to high levels, both the formation of an electrode having excellent flexibility and uniformity and the enhancement of rate characteristics and cycle characteristics of a secondary battery including the obtained electrode.

In the presently disclosed slurry composition for a non-aqueous secondary battery electrode, the conductive material preferably includes one or more carbon nanotubes. The compounding of carbon nanotubes in the presently disclosed slurry composition makes it possible to further enhance the rate characteristics of an obtained secondary battery.

Furthermore, the present disclosure aims to advantageously solve the problem set forth above, and a presently disclosed electrode for a non-aqueous secondary battery comprises an electrode mixed material layer containing: a polymer α and a polymer β as a binder component; a plasticizer; an electrode active material; and a conductive material, wherein the polymer α is a particulate polymer that includes a (meth)acrylic acid ester monomer unit and an ethylenically unsaturated acid monomer unit, and the polymer β is a highly soluble polymer that includes a nitrile group-containing monomer unit and either or both of an amide group-containing monomer unit and a (meth)acrylic acid ester monomer unit having an alkyl chain carbon number of not less than 1 and not more than 6, wherein proportional content of the nitrile group-containing monomer unit is not less than 70 mass % and not more than 95 mass % and total proportional content of the amide group-containing monomer unit and the (meth)acrylic acid ester monomer unit is not less than 0.1 mass % and not more than 20 mass % when all monomer units forming the polymer β are taken to be 100 mass %, in total. The electrode for a non-aqueous secondary battery that contains a plasticizer, an electrode active material, a conductive material, and a binder component including two polymers satisfying specific chemical compositions has excellent flexibility and uniformity and can enhance the rate characteristics and cycle characteristics of a secondary battery.

The presently disclosed electrode for a non-aqueous secondary battery preferably further comprises, as the binder component, a polymer γ that is a highly soluble polymer having an iodine value of not less than 5 g/100 g and not more than 100 g/100 g. When the electrode for a non-aqueous secondary battery further contains, as the binder component, a polymer γ that is a highly soluble polymer having an iodine value within the range set forth above, the rate characteristics of a secondary battery including the electrode can be further enhanced.

Also, the present disclosure aims to advantageously solve the problem set forth above, and a presently disclosed non-aqueous secondary battery comprises an electrode for a non-aqueous secondary battery including an electrode mixed material layer formed using any one of the slurry compositions for a non-aqueous secondary battery electrode set forth above. Alternatively, the presently disclosed non-aqueous secondary battery comprises any one of the electrodes for a non-aqueous secondary battery set forth above. By using an electrode for a non-aqueous secondary battery that includes an electrode mixed material layer formed using any one of the slurry compositions for a non-aqueous secondary battery electrode set forth above or by using any one of the electrodes for a non-aqueous secondary battery set forth above in this manner, it is possible to provide a non-aqueous secondary battery having excellent rate characteristics, cycle characteristics, and so forth.

Advantageous Effect

According to the present disclosure, it is possible to provide a binder composition for a non-aqueous secondary battery electrode and a slurry composition for a non-aqueous secondary battery electrode with which it is possible to simultaneously achieve, to high levels, both the formation of an electrode having excellent flexibility and uniformity and the enhancement of rate characteristics and cycle characteristics of a secondary battery including the obtained electrode.

Moreover, according to the present disclosure, it is possible to provide an electrode for a non-aqueous secondary battery that has excellent flexibility and uniformity and that can enhance the rate characteristics and cycle characteristics of a secondary battery.

Furthermore, according to the present disclosure, it is possible to provide a non-aqueous secondary battery that has excellent rate characteristics and cycle characteristics.

DETAILED DESCRIPTION

The following provides a detailed description of embodiments of the present disclosure.

The presently disclosed binder composition for a non-aqueous secondary battery electrode can be used in production of a slurry composition for a non-aqueous secondary battery electrode. Moreover, a slurry composition for a non-aqueous secondary battery electrode that is produced using the presently disclosed binder composition for a non-aqueous secondary battery electrode can suitably be used in formation of an electrode of a non-aqueous secondary battery such as a lithium ion secondary battery. Furthermore, a feature of the presently disclosed non-aqueous secondary battery is that the presently disclosed electrode for a non-aqueous secondary battery is used therein.

Note that the presently disclosed binder composition for a non-aqueous secondary battery electrode and slurry composition for a non-aqueous secondary battery electrode can suitably be used, in particular, in formation of a positive electrode of a non-aqueous secondary battery.

(Binder Composition for Secondary Battery Electrode)

The presently disclosed binder composition for a non-aqueous secondary battery electrode is a binder composition for a non-aqueous secondary battery electrode that contains a polymer α and a polymer as a binder component and that also contains a plasticizer and an organic solvent. Features thereof are that the polymer α is an insoluble polymer that includes a (meth)acrylic acid ester monomer unit and an ethylenically unsaturated acid monomer unit and that the polymer β is a highly soluble polymer that includes a nitrile group-containing monomer unit and either or both of an amide group-containing monomer unit and a (meth)acrylic acid ester monomer unit having an alkyl chain carbon number of not less than 1 and not more than 6, wherein the proportional content of the nitrile group-containing monomer unit is not less than 70 mass % and not more than 95 mass % and the total proportional content of the amide group-containing monomer unit and the (meth)acrylic acid ester monomer unit is not less than 0.1 mass % and not more than 20 mass % when all monomer units forming the polymer β are taken to be 100 mass %, in total. The presently disclosed binder composition for a non-aqueous secondary battery electrode preferably further contains, as the binder component, a polymer γ that is a polymer having specific properties, in addition to the polymers α and β. Moreover, the presently disclosed binder composition for a non-aqueous secondary battery electrode may contain other binder components that differ in terms of contained components to the binder component described above. Polymers that can correspond to the polymers α to γ are not included among such other binder components.

The presently disclosed binder composition for a non-aqueous secondary battery electrode (hereinafter, also referred to simply as a "binder composition") enables the formation of an electrode having excellent flexibility and uniformity and the enhancement of rate characteristics and cycle characteristics of a secondary battery including the obtained electrode as a result of containing a plasticizer and the polymers α and β that satisfy the chemical composition and property conditions set forth above. Although the reason for this is not clear, it is presumed to be as follows.

Firstly, the polymer α, which is a polymer that is insoluble in an organic solvent (i.e., is present in a particulate form in an organic solvent and a formed electrode), can function to maintain the flexibility of an electrode and to effectively adhere adherend components to one another by causing point adhesion of adherend components such as an electrode active material in an electrode mixed material layer. Accordingly, the polymer α can contribute to increasing the flexibility of a formed electrode mixed material layer. Moreover, the polymer β contributes to imparting appropriate viscosity to a slurry composition in a situation in which a slurry composition is produced. Accordingly, the polymer β contributes to increasing the uniformity and peel strength of an electrode obtained using that slurry composition and can also act to relieve concentration of stress and resistance in the electrode and to ultimately enhance the rate characteristics and cycle characteristics of an obtained secondary battery. Furthermore, the plasticizer can function to increase the flexibility of an obtained electrode and to thereby enhance the rate characteristics and cycle characteristics of a secondary battery. This is thought to be due to the plasticizer acting to lower the crystallinity and glass-transition temperature of the polymer α and the polymer β. When a plasticizer has been combined with a conventional binder component such as polyvinylidene fluoride instead of the polymer β, there have been instances in which degradation of an active material has occurred and in which battery characteristics such as cycle characteristics and rate characteristics have deteriorated. However, in a situation in which a plasticizer is used in combination with the polymers α and β that satisfy specific chemical compositions and properties in the present disclosure, it is possible to obtain an electrode that has high flexibility and uniformity and to effectively enhance battery characteristics such as rate characteristics and cycle characteristics.

<Polymer α>

The polymer α is a component that, in an electrode produced by forming an electrode mixed material layer on a current collector using a slurry composition that contains the binder composition, holds components contained in the electrode mixed material layer so that they do not detach from the electrode mixed material layer (i.e., functions as a binder). The polymer α is an insoluble polymer that is insoluble in an organic solvent and is a particulate polymer that is present in a particulate form in an organic solvent and a formed electrode. It is possible to confirm that the polymer α is insoluble in an organic solvent and has a "particulate form" in an electrode by methods described in the EXAMPLES section. When the polymer α is referred to as being "insoluble" in an organic solvent, this means that when dry polymer α is left for 72 hours in N-methyl-2-pyrrolidone having a temperature of 60° C. and is then filtered at 200 mesh, the dry mass of insoluble content that is obtained is 70 mass % or more relative to the total mass of the dry polymer α that is used. The polymer α is a component that can display adhesive capability through point adhesion of an adherend in an electrode. Consequently, the polymer α can display adhesive capability in an electrode while also increasing the flexibility of the electrode.

[Chemical Composition of Polymer α]

The polymer α is required to include a (meth)acrylic acid ester monomer unit and an ethylenically unsaturated acid monomer unit as repeating units. The polymer α can also optionally include a cross-linkable monomer unit and other monomer units besides those mentioned above as repeating units.

[(Meth)Acrylic Acid Ester Monomer Unit]

The (meth)acrylic acid ester monomer unit is a repeating unit that is derived from a (meth)acrylic acid ester monomer. The inclusion of the (meth)acrylic acid ester monomer unit in the polymer α makes it possible to increase the peel strength of an obtained electrode mixed material layer and to improve the rate characteristics of an obtained secondary battery.

The (meth)acrylic acid ester monomer may be a (meth) acrylic acid alkyl ester monomer in which the number of ethylenically unsaturated bonds is 1. Examples of (meth) acrylic acid alkyl ester monomers that may be used include (meth)acrylic acid alkyl ester monomers that include a linear alkyl group and (meth)acrylic acid alkyl ester monomers that include a branched alkyl group. The (meth)acrylic acid ester monomer may be an acrylic acid alkyl ester such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, 2-ethylhexyl acrylate, nonyl acrylate, decyl acrylate, lauryl acrylate, n-tetradecyl acrylate, or stearyl acrylate; a methacrylic acid alkyl ester such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, or stearyl methacrylate; or the like, for example. Of these (meth)acrylic acid ester monomers, (meth)acrylic acid alkyl esters in which the alkyl chain is linear are preferable from a viewpoint of imparting a suitable degree of affinity with electrolyte solution to an obtained electrode mixed material layer, and butyl acrylate and methyl methacrylate are more preferable. Note that just one of these (meth)acrylic acid ester monomers may be used, or two or more of these (meth)acrylic acid ester monomers may be used in combination.

The proportional content of the (meth)acrylic acid ester monomer unit in the polymer α when all repeating units included in the polymer α are taken to be 100.0 mass % is preferably 30.0 mass % or more, more preferably 40.0 mass % or more, and even more preferably 50.0 mass % or more, and is preferably 98.0 mass % or less, and more preferably 95.0 mass % or less. By setting the proportional content of the (meth)acrylic acid ester monomer unit in the polymer α within any of the ranges set forth above, it is possible to impart a suitable degree of affinity with electrolyte solution to an obtained electrode mixed material layer and to improve the rate characteristics of a secondary battery that includes the electrode mixed material layer.

[Ethylenically Unsaturated Acid Monomer Unit]

The ethylenically unsaturated acid monomer unit is a repeating unit that is derived from an ethylenically unsaturated acid monomer. The polymer α can display excellent binding strength as a result of including the ethylenically unsaturated acid monomer unit. Consequently, an electrode mixed material layer that is formed using a slurry composition containing the presently disclosed binder composition can display even better peel strength. Note that the "ethylenically unsaturated acid monomer unit" referred to in the present specification is a unit that is derived from a monomer including an ethylenically unsaturated bond and an acidic group.

Examples of ethylenically unsaturated acid monomers that can form the ethylenically unsaturated acid monomer unit include monomers that include a carboxy group, a sulfo group, or a phosphate group in addition to an ethylenically unsaturated bond.

Examples of carboxy group-containing monomers include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, and α-chloro-β-E-methoxyacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid monoesters such as nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

An acid anhydride that produces a carboxy group through hydrolysis can also be used as a carboxy group-containing monomer.

Examples of sulfo group-containing monomers include styrene sulfonic acid, vinyl sulfonic acid, methyl vinyl sulfonic acid, (meth)allyl sulfonic acid, 3-allyloxy-2-hydroxypropane sulfonic acid, and 2-acrylamido-2-methylpropane sulfonic acid.

Note that in the present disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

Note that in the present disclosure, "(meth)acryloyl" is used to indicate "acryloyl" and/or "methacryloyl".

One of these ethylenically unsaturated acid monomers may be used individually, or two or more of these ethylenically unsaturated acid monomers may be used in combination. Of these ethylenically unsaturated acid monomers, acrylic acid, methacrylic acid, itaconic acid, maleic acid, and fumaric acid are preferable from a viewpoint of further improving the peel strength of an obtained electrode mixed material layer, and acrylic acid and methacrylic acid are more preferable.

The proportional content of the ethylenically unsaturated acid monomer unit in the polymer α when all repeating units in the polymer α are taken to be 100.0 mass % is preferably 1.0 mass % or more, more preferably 1.5 mass % or more, even more preferably 2.0 mass % or more, and further preferably 3.0 mass % or more, and is preferably 10.0 mass % or less, more preferably 8.0 mass % or less, even more preferably 6.0 mass % or less, and further preferably 5.0 mass % or less. By setting the proportional content of the ethylenically unsaturated acid monomer unit as not less than any of the lower limits set forth above, it is possible to increase the peel strength of an electrode mixed material layer formed using a slurry composition that contains the binder composition. In particular, by setting the proportional content of the ethylenically unsaturated acid monomer unit as not more than any of the upper limits set forth above, it is possible to improve the flexibility of the polymer α and to thereby further improve the peel strength of an obtained electrode mixed material layer.

[Cross-Linkable Monomer Unit]

The cross-linkable monomer unit is a repeating unit that is derived from a cross-linkable monomer. The cross-linkable monomer is a monomer that can form a cross-linked structure upon polymerization. When the polymer α includes the cross-linkable monomer unit, the peel strength of an obtained electrode mixed material layer can be further increased. Examples of cross-linkable monomers that may be used include monomers having at least two reactive groups per one molecule.

More specifically, a polyfunctional ethylenically unsaturated carboxylic acid ester monomer that includes at least two ethylenically unsaturated bonds may be used as the cross-linkable monomer.

Examples of difunctional ethylenically unsaturated carboxylic acid ester monomers that include two ethylenically unsaturated bonds in a molecule include allyl acrylate, allyl methacrylate, ethylene diacrylate, ethylene dimethacrylate, 2-hydroxy-3-acryloyloxypropyl methacrylate, polyethylene glycol diacrylate, propoxylated ethoxylated bisphenol A diacrylate, ethoxylated bisphenol A diacrylate, 9,9-bis[4-(2-acryloyloxyethoxy)phenyl]fluorene, propoxylated bisphenol A diacrylate, tricyclodecane dimethanol diacrylate, 1,10-decanediol diacrylate, 1,6-hexanediol diacrylate, 1,9-nonanediol diacrylate, polypropylene glycol diacrylate, polypropylene glycol dimethacrylate, polytetramethylene glycol diacrylate, ethylene glycol dimethacrylate, diethylene glycol dimethacrylate, polyethylene glycol dimethacrylate, ethoxylated bisphenol A dimethacrylate, tricyclodecane dimethanol dimethacrylate, 1,10-decanediol dimethacrylate, 1,6-hexanediol dimethacrylate, 1,9-nonanediol dimethacrylate, neopentyl glycol dimethacrylate, ethoxylated polypropylene glycol dimethacrylate, and glycerin dimethacrylate.

Examples of trifunctional ethylenically unsaturated carboxylic acid ester monomers including three ethylenically unsaturated bonds in a molecule include ethoxylated isocyanuric acid triacrylate, ε-caprolactone-modified tris(2-acryloxyethyl) isocyanurate, ethoxylated glycerin triacrylate, pentaerythritol triacrylate, trimethylolpropane triacrylate, and trimethylolpropane trimethacrylate.

Examples of ethylenically unsaturated carboxylic acid ester monomers having a functionality of 4 or higher that include four or more ethylenically unsaturated bonds in a molecule include di(trimethylolpropane) tetraacrylate, ethoxylated pentaerythritol tetraacrylate, pentaerythritol tetraacrylate, dipentaerythritol polyacrylate, and dipentaerythritol hexaacrylate.

Of these cross-linkable monomers, allyl methacrylate (difunctional), ethylene glycol dimethacrylate (difunctional), trimethylolpropane triacrylate (trifunctional), and ethoxylated pentaerythritol tetraacrylate (tetrafunctional) are preferable from a viewpoint of improving the peel strength, flexibility, and so forth of an obtained electrode mixed material layer.

The proportional content of the cross-linkable monomer unit in the polymer α when all repeating units included in the polymer α are taken to be 100.0 mass % is preferably 0.01 mass % or more, more preferably 0.05 mass % or more, and even more preferably 0.1 mass % or more, and is preferably 5.0 mass % or less, more preferably 2.0 mass % or less, and even more preferably 1.5 mass % or less. By setting the proportional content of the cross-linkable monomer unit in the polymer α as not less than any of the lower limits set forth above, it is possible to further improve the peel strength of an obtained electrode mixed material layer. Moreover, by setting the proportional content of the cross-linkable monomer unit in the polymer α as not more than any of the upper limits set forth above, it is possible to improve the flexibility of an obtained electrode mixed material layer and to thereby further improve the peel strength of the obtained electrode mixed material layer.

[Other Monomer Units]

The polymer α may further include other monomer units that are derived from other monomers that are copolymerizable with various monomers such as described above. Known monomers that can be used in the production of a binding component in a binder composition for an electrode of a non-aqueous secondary battery may be used as other monomers that can form such other monomer units. More specifically, nitrile group-containing monomers and amide group-containing monomers described in detail in the "Polymer β" section, aromatic vinyl monomers described in detail in the "Polymer γ" section, and so forth can be used as other monomers, for example. One of these other monomers may be used individually, or two or more of these other monomers may be used in combination.

The proportional content of other monomer units in the polymer α when all repeating units in the polymer α are taken to be 100.0 mass % is preferably 50.0 mass % or less, and may be 0.0 mass %.

[Amount of NMP-Insoluble Content]

The amount of insoluble content when the polymer α is mixed with N-methyl-2-pyrrolidone in a concentration of 8 mass % is required to be 70 mass % or more, is preferably 80 mass % or more, and more preferably 90 mass % or more, and may be 100 mass % (i.e., the polymer α may be completely insoluble in N-methyl-2-pyrrolidone (hereinafter, also abbreviated as "NMP")). When the amount of NMP-insoluble content is 70 mass % or more, the battery characteristics of a secondary battery that includes an obtained electrode mixed material layer can be further improved. Note that the amount of NMP-insoluble content can be controlled by adjusting the amount of a cross-linkable monomer in a monomer composition that is used to produce the polymer α. The amount of NMP-insoluble content in the polymer α can be measured by a method described in the EXAMPLES section.

[Production Method of Polymer α]

No specific limitations are placed on the method by which the above-described polymer α is produced. The polymerization method used in production of the polymer α may be a method such as solution polymerization, suspension polymerization, bulk polymerization, or emulsion polymerization without any specific limitations. Moreover, ionic polymerization, radical polymerization, living radical polymerization, or the like may be adopted as the polymerization reaction. The polymerization may be carried out with a commonly used emulsifier, dispersant, polymerization initiator, chain transfer agent, or the like.

<Polymer β>

The polymer β is a component that can impart appropriate viscosity to a slurry composition in a situation in which a slurry composition is produced. The polymer β is also a component that can function in conjunction with the polymer α as a binder in an electrode mixed material layer. Moreover, the polymer β is a component that is highly soluble in the constituent organic solvent of the binder composition. Note that when the polymer β is referred to as being "highly soluble" in an organic solvent, this means that when dry polymer β is left for 72 hours in N-methyl-2-pyrrolidone having a temperature of 60° C. and is then filtered at 200 mesh, the dry mass of insoluble content that is obtained is 50 mass % or less relative to the total mass of the dry polymer β that is used. The polymer β is a component that functions to increase the uniformity and peel strength of an obtained electrode and enhance the rate characteristics and cycle characteristics of an obtained secondary battery.

The polymer β is required to include a nitrile group-containing monomer unit in a proportion of not less than 70.0 mass % and not more than 95.0 mass % when all repeating units included in the polymer are taken to be 100 mass % as previously described. The polymer preferably includes the nitrile group-containing monomer unit in a proportion of 80.0 mass % or more. When the proportion constituted by the nitrile group-containing monomer unit in the polymer β is not less than any of the lower limits set forth above, the polymer β readily adsorbs to an electrode active material in a situation in which a slurry composition is produced and enables good thin-film coating of the electrode active material. This can enhance the battery characteristics of an obtained secondary battery. Moreover, when the proportion constituted by the nitrile group-containing monomer unit in the polymer β is not more than the upper limit set forth above, the flexibility of an obtained electrode can be further increased.

Examples of nitrile group-containing monomers that can be used to form the nitrile group-containing monomer unit include α,β-ethylenically unsaturated nitrile monomers. Specifically, the α,β-ethylenically unsaturated nitrile monomer may be acrylonitrile; an α-halogenoacrylonitrile such as α-chloroacrylonitrile or α-bromoacrylonitrile; an α-alkylacrylonitrile such as methacrylonitrile or α-ethylacrylonitrile; or the like, for example. One of these nitrile group-containing monomers may be used individually, or two or more of these nitrile group-containing monomers may be used in combination. Of these nitrile group-containing monomers, acrylonitrile and methacrylonitrile are preferable from a viewpoint of increasing the binding strength that can be displayed by the polymer and increasing the peel strength of an obtained electrode, and acrylonitrile is more preferable. One of these nitrile group-containing monomers may be used individually, or two or more of these nitrile group-containing monomers may be used in combination.

The polymer β is also required to include, in addition to the nitrile group-containing monomer unit, either or both of an amide group-containing monomer unit and a (meth)acrylic acid ester monomer unit having an alkyl chain carbon number of not less than 1 and not more than 6 as previously described. In particular, it is preferable that the polymer β includes both an amide group-containing monomer unit and a (meth)acrylic acid ester monomer unit having an alkyl chain carbon number of not less than 1 and not more than 6. The total proportional content of the amide group-containing monomer unit and the (meth)acrylic acid ester monomer unit in the polymer β when all repeating units are taken to be 100 mass % is required to be not less than 0.1 mass % and not more than 20 mass %, is preferably 0.5 mass % or more, and more preferably 1 mass % or more, and is preferably 15 mass % or less.

The amide group-containing monomer unit can be formed using an amide group-containing monomer. Examples of amide group-containing monomers that may be used include, but are not specifically limited to, N-vinylacetamide, (meth)acrylamide, N-methylol(meth)acryl amide, dimethyl(meth)acrylamide, diethyl(meth)acrylamide, N-methoxymethyl(meth)acrylamide, and dimethylaminopropyl (meth)acrylamide. Of these examples, (meth)acrylamide is preferable, and acrylamide is more preferable as an amide group-containing monomer used for forming the polymer (3. The proportional content of the amide group-containing monomer unit in the polymer β when all repeating units are taken to be 100 mass % may be 0 mass %, is preferably 0.05 mass % or more, more preferably 0.1 mass % or more, even more preferably 0.5 mass % or more, and further preferably 1.0 mass % or more, and is preferably 5 mass % or less, and more preferably 2 mass % or less. When the proportional content of the amide group-containing monomer unit is not less than any of the lower limits set forth above, the flexibility and peel strength of an obtained electrode can be further increased.

The (meth)acrylic acid ester monomer unit having an alkyl chain carbon number of not less than 1 and not more than 6 can be formed using a (meth)acrylic acid ester monomer having an alkyl chain carbon number of not less than 1 and not more than 6. Examples of (meth)acrylic acid ester monomers having an alkyl chain carbon number of not less than 1 and not more than 6 include (meth)acrylic acid alkyl ester monomers, from among those listed in the "Polymer α" section, for which the carbon number of an alkyl chain is not less than 1 and not more than 6. In other words, the (meth)acrylic acid ester monomer having an alkyl chain carbon number of not less than 1 and not more than 6 may be an acrylic acid alkyl ester such as methyl acrylate, ethyl acrylate, n-propyl acrylate, isopropyl acrylate, n-butyl acrylate, t-butyl acrylate, pentyl acrylate, or hexyl acrylate; a methacrylic acid alkyl ester such as methyl methacrylate, ethyl methacrylate, n-propyl methacrylate, isopropyl methacrylate, n-butyl methacrylate, t-butyl methacrylate, pentyl methacrylate, or hexyl methacrylate; or the like. Of these (meth)acrylic acid ester monomers, (meth)acrylic acid alkyl esters in which the alkyl chain is linear are preferable from a viewpoint of imparting a suitable degree of affinity with electrolyte solution to an obtained electrode mixed material layer, and butyl acrylate is more preferable. Note that just one of these (meth)acrylic acid ester monomers may be used, or two or more of these (meth)acrylic acid ester monomers may be used in combination. The proportional content of the (meth)acrylic acid ester monomer unit having a carbon number of not less than 1 and not more than 6 in the polymer β when all repeating units are taken to be 100 mass % may be 0 mass %, is preferably 0.05 mass % or more, more preferably 0.1 mass % or more, and even more preferably 1 mass % or more, and is preferably 20 mass % or less, and more preferably 15 mass % or less. When the proportional content of the (meth)acrylic acid ester monomer unit having a carbon number of not less than 1 and not more than 6 is not less than any of the lower limits set forth above, the flexibility and peel strength of an obtained electrode can be further increased.

The polymer β may also include other monomer units, such as an ethylenically unsaturated acid monomer unit, besides the monomer units described above. Examples of monomers that can be used to form the ethylenically unsaturated acid monomer unit include the various monomers listed in the "Polymer α" section, but are not specifically limited thereto. The proportional content of the ethylenically unsaturated acid monomer unit in the polymer β when all repeating units are taken to be 100 mass % is preferably 0.1 mass % or more, and more preferably 1 mass % or more, and is preferably 10 mass % or less, and more preferably 5 mass % or less, for example.

The weight-average molecular weight of the polymer β is preferably 200,000 or more, more preferably 400,000 or more, and even more preferably 600,000 or more, and is preferably 2,000,000 or less, more preferably 1,500,000 or less, and even more preferably 1,300,000 or less. When the weight-average molecular weight of the polymer β is not less than any of the lower limits set forth above, the peel strength of an obtained electrode can be further increased. Moreover, when the weight-average molecular weight of the polymer β is not more than any of the upper limits set forth above, the rate characteristics and cycle characteristics of an obtained secondary battery can be enhanced.

The polymer β can be produced according to a known method such as described in the "Production method of polymer α" section, for example, without any specific limitations.

<Polymer γ>

The polymer γ is a component that can function to further increase the flexibility and uniformity of an obtained electrode. The polymer γ is also a component that can function in conjunction with the polymer α and the polymer β as a binder in an electrode mixed material layer. Moreover, the polymer γ is a component that is highly soluble in the constituent organic solvent of the binder composition. Note that when the polymer γ is referred to as being "highly soluble" in an organic solvent, this means that when dry polymer γ is left for 72 hours in N-methyl-2-pyrrolidone having a temperature of 60° C. and is then filtered at 200 mesh, the dry mass of insoluble content that is obtained is 50 mass % or less relative to the total mass of the dry polymer γ that is used. When the binder composition contains the polymer γ as the binder component, it is possible to further increase the flexibility and uniformity of an obtained electrode. Moreover, when the binder composition contains the polymer γ as the binder component, it is possible to increase the peel strength of an obtained electrode.

The iodine value of the polymer γ is not less than 5 g/100 g and not more than 100 g/100 g, and is preferably 10 g/100 g or more, and more preferably 20 g/100 g or more. When the iodine value of the polymer γ is not less than any of the lower limits set forth above, the flexibility of an obtained electrode can be further increased. Moreover, when the iodine value of the polymer γ is not more than the upper limit set forth above, the uniformity and peel strength of an obtained electrode can be further increased.

The weight-average molecular weight of the polymer γ is preferably 5,000 or more, more preferably 70,000 or more, and even more preferably 100,000 or more, and is preferably 500,000 or less, more preferably 400,000 or less, and even more preferably 350,000 or less. When the weight-average molecular weight of the polymer γ is not less than any of the lower limits set forth above, the peel strength of an obtained electrode can be further increased. Moreover, when the weight-average molecular weight of the polymer γ is not more than any of the upper limits set forth above, the rate characteristics and cycle characteristics of an obtained secondary battery can be enhanced.

The polymer γ may have any chemical composition without any specific limitations so long as it is possible to satisfy the iodine value range set forth above. In particular, it is preferable that the polymer γ includes an aromatic vinyl monomer unit, a nitrile group-containing monomer unit, an ethylenically unsaturated acid monomer unit, and a linear alkylene structural unit having a carbon number of 4 or more.

Examples of monomers that can be used to form the aromatic vinyl monomer unit include aromatic vinyl monomers such as styrene, α-methylstyrene, butoxystyrene, vinyltoluene, and vinylnaphthalene. Note that the aromatic vinyl monomer does not include an acidic group. One of these aromatic vinyl monomers may be used individually, or two or more of these aromatic vinyl monomers may be used in combination. Of these aromatic vinyl monomers, styrene is preferable from a viewpoint of good copolymerizability. The proportional content of the aromatic vinyl monomer unit in the polymer γ when all repeating units (total of structural units and monomer units) in the polymer γ are taken to be 100 mass % is preferably 30 mass % or more, more preferably 35 mass % or more, and even more preferably 40 mass % or more, and is preferably 55 mass % or less, more preferably 50 mass % or less, and even more preferably 45 mass % or less.

Examples of monomers that can be used to form the nitrile group-containing monomer unit include the same monomers as the various monomers previously listed in the "Polymer β" section. One of these monomers may be used individually, or two or more of these monomers may be used in combination. Of these monomers, acrylonitrile and methacrylonitrile are preferable from a viewpoint of increasing the binding strength that can be displayed by the polymer γ, and acrylonitrile is more preferable. One of these monomers may be used individually, or two or more of these monomers may be used in combination. The proportional content of the nitrile group-containing monomer unit in the polymer γ when all repeating units are taken to be 100 mass % is preferably 10 mass % or more, more preferably 13 mass % or more, and even more preferably 18 mass % or more, and is preferably 40 mass % or less, more preferably 33 mass % or less, and even more preferably 28 mass % or less.

Examples of monomers that can be used to form the ethylenically unsaturated acid monomer unit include the same monomers as the various monomers previously listed in the "Ethylenically unsaturated acid monomer unit" section of the "Polymer α" section. Of these monomers, acrylic acid and methacrylic acid are preferable because they can efficiently trap transition metal ions that may elute, in particular, from a positive electrode active material, and methacrylic acid is more preferable. The proportional content of the ethylenically unsaturated acid monomer unit in the polymer γ when all repeating units are taken to be 100 mass % is preferably 0.1 mass % or more, and more preferably 1 mass % or more, and is preferably 10 mass % or less, and more preferably 6 mass % or less.

The linear alkylene structural unit having a carbon number of 4 or more (hereinafter, also referred to simply as an "alkylene structural unit") is a repeating unit that is composed of only a linear alkylene structure having a carbon number of 4 or more represented by a general formula: $—C_nH_{2n}—$ (n is an integer of 4 or more). The method by which the linear alkylene structural unit having a carbon number of 4 or more is introduced into the polymer γ is not specifically limited and may, for example, be either of the following methods (1) or (2).

(1) A method in which a polymer is produced from a monomer composition containing a conjugated diene monomer and then the polymer is hydrogenated so as to convert a conjugated diene monomer unit to a linear alkylene structural unit having a carbon number of 4 or more (2) A method in which a polymer is produced from a monomer composition containing a 1-olefin monomer having a carbon number of 4 or more such as 1-butene or 1-hexene One of these conjugated diene monomers or 1-olefin monomers may be used individually, or two or more of these conjugated diene monomers or 1-olefin monomers may be used in combination.

Of these methods, method (1) is preferable in terms of ease of production of the polymer.

Examples of conjugated diene monomers that can be used in method (1) include conjugated diene compounds having a carbon number of 4 or more such as 1,3-butadiene, isoprene, 2,3-dimethyl-1,3-butadiene, and 1,3-pentadiene. One of these conjugated diene monomers may be used individually, or two or more of these conjugated diene monomers may be used in combination. Of these conjugated diene monomers, 1,3-butadiene is preferable. In other words, the linear alkylene structural unit having a carbon number of 4 or more is preferably a structural unit obtained through hydrogenation of a conjugated diene monomer unit (i.e., is preferably a hydrogenated conjugated diene unit), and is more preferably a structural unit obtained through hydrogenation of a 1,3-butadiene unit (i.e., is more preferably a hydrogenated 1,3-butadiene unit). Selective hydrogenation of a conjugated diene monomer unit can, for example, be carried out by a commonly known method such as an oil-layer hydrogenation method or a water-layer hydrogenation method.

The polymer γ can be produced by polymerizing a monomer composition containing the monomers described above to obtain a copolymer and subsequently hydrogenating the obtained copolymer as necessary, for example, but is not specifically limited to being produced in this manner.

The proportional content of the linear alkylene structural unit having a carbon number of 4 or more in the polymer γ when all repeating units are taken to be 100 mass % is preferably 15 mass % or more, more preferably 20 mass % or more, and even more preferably 25 mass % or more, and is preferably 50 mass % or less, more preferably 45 mass % or less, and even more preferably 40 mass % or less.

Note that in a case in which a linear alkylene structural unit having a carbon number of 4 or more that is included in the polymer γ is formed by a method in which a polymer is produced from a monomer composition containing a conjugated diene monomer and is then hydrogenated, it is preferable that the total proportional content of the linear alkylene structural unit having a carbon number of 4 or more that is included in the polymer γ and a conjugated diene monomer unit that remains in the polymer γ without being hydrogenated satisfies any of the ranges set forth above.

<Content Ratios of Polymers α to γ>

Content ratios in the binder composition of the polymers α to γ that satisfy the property and/or chemical composition conditions set forth above are preferably within ranges set forth below when the content of the binder component in the binder composition is taken to be 100 mass %.

Firstly, the content ratio (a) of the above-described polymer α is preferably 5 mass % or more, and more preferably 10 mass % or more, and is preferably 60 mass % or less, more preferably 50 mass % or less, even more preferably 40 mass % or less, and particularly preferably 30 mass % or less. When the content ratio (a) of the polymer α is not less than any of the lower limits set forth above, the flexibility of an electrode formed using the binder composition can be sufficiently increased. Moreover, when the content ratio (a) of the polymer α is not more than any of the upper limits set forth above, the peel strength of an obtained electrode can be increased.

The content ratio (b) of the above-described polymer β is preferably 20 mass % or more, more preferably 30 mass % or more, even more preferably 35 mass % or more, and further preferably 40 mass % or more, and is preferably 94 mass % or less. When the content ratio (b) of the polymer β is not less than any of the lower limits set forth above, the uniformity of an obtained electrode can be increased, and the cycle characteristics of a secondary battery that includes the electrode can be enhanced. Moreover, when the content ratio (b) of the polymer β is not more than the upper limit set forth above, the rate characteristics of an obtained secondary battery can be enhanced.

The content ratio (c) of the above-described polymer γ is preferably 0.1 mass % or more, and more preferably 1 mass % or more, and is preferably 50 mass % or less, more preferably 40 mass % or less, even more preferably 30 mass % or less, and particularly preferably 20 mass % or less. When the content ratio (c) of the polymer γ is not less than any of the lower limits set forth above, the flexibility, uniformity, and peel strength of an obtained electrode can be further increased. Moreover, when the content ratio (c) of the polymer γ is not more than any of the upper limits set forth above, the battery characteristics of an obtained secondary battery can be further improved.

<Relationship Between Content Ratios (a) to (c)>

With regards to the content ratio (a) of the polymer α and the content ratio (b) of the polymer β, a value for the proportion (%) constituted by the polymer α among the total content ratio of the polymers α and β, which is expressed by a formula: $a/(a+b)\times100$, preferably satisfies $10\leq a/(a+b)\times100\leq50$, more preferably satisfies $10\leq a/(a+b)\times100\leq40$, and even more preferably satisfies $10\leq a/(a+b)\times100\leq35$. When $a/(a+b)\times100$ has a value of 10 or more, point adhesion of adherend components to one another through the polymer α can occur with sufficient frequency, and the flexibility of an obtained electrode mixed material layer can be further increased. Moreover, when $a/(a+b)\times100$ has a value of 50 or less, the uniformity of an obtained electrode can be increased, and the rate characteristics and cycle characteristics of an obtained secondary battery can be further enhanced.

With regards to the content ratio (a) of the polymer α and the content ratio (c) of the polymer γ, a value for the proportion (%) constituted by the polymer α among the total content ratio of the polymers α and γ, which is expressed by a formula: $a/(a+c)\times100$, preferably satisfies $20\leq a/(a+c)\times100\leq90$, and more preferably satisfies $50\leq a/(a+c)\times100\leq90$. When $a/(a+c)\times100$ has a value of 20 or more, the peel strength of an obtained electrode mixed material layer can be further increased. Moreover, when $a/(a+c)\times100$ has a value of 90 or less, the rate characteristics of an obtained secondary battery can be further enhanced.

<NMP Solubility of Polymers α and β>

The above-described polymers α and β are preferably polymers satisfying a condition that, in a situation in which an N-methyl-2-pyrrolidone mixture of 8 mass % in solid content concentration is produced such as to contain, as solid content, the polymer α in the content ratio (a) and the polymer β in the content ratio (b), the proportion of insoluble content in the mixture is not less than 30 mass % and not more than 80 mass %. The polymers α and β are more preferably polymers for which the aforementioned proportion of insoluble content is not less than 35 mass % and not more than 75 mass %. When the proportion of insoluble content is 30 mass % or more, the flexibility of an obtained electrode mixed material layer can be further increased. Moreover, when the proportion of insoluble content of 80 mass % or less, the rate characteristics and cycle characteristics of an obtained secondary battery can be enhanced.

<Other Binders>

The presently disclosed binder composition may, besides the above-described polymers α to γ, contain other binders differing from these polymers as other binder components. Examples of such binders include fluoropolymer binders such as polyvinylidene fluoride, polyvinyl acetate binders, polyacrylic acid binders, and polyvinyl alcohol binders. Note that in a case in which the presently disclosed binder composition contains another binder component, the proportional content of this other binder component when the mass of all binder components contained in the binder composition is taken to be 100 mass % is preferably less than 50 mass %, more preferably 40 mass % or less, even more preferably 30 mass % or less, and may be 0 mass % (i.e., the presently disclosed binder composition may contain just the above-described polymers α to γ as a binder component).

<Plasticizer>

The plasticizer is a component that acts with respect to the polymers contained as the binder component to increase the flexibility of an obtained electrode, and can thereby function to enhance the rate characteristics and cycle characteristics of a secondary battery. The plasticizer is also a component that can act to protect the surface of an electrode active material in an obtained electrode. In this respect, too, the plasticizer is a component that can act to enhance the battery characteristics of a secondary battery.

Various compounds can be used as the plasticizer of the presently disclosed binder composition without any specific limitations. More specifically, examples of plasticizers that can be used include phosphoric acid ester plasticizers such as diphenyl octyl phosphate, tributyl phosphate, trimethyl phosphate, tricresyl phosphate, triphenyl phosphate, trixylenyl phosphate, tri-2-ethylhexyl phosphate, 2-ethylhexyl diphenyl phosphate, tris(isopropylphenyl) phosphate, resorcinol bis(diphenyl phosphate), bisphenol A bis(diphenyl phosphate), bisphenol A bis(cresyl phosphate), and 2-ethylhexyl diphenyl phosphate; citric acid ester plasticizers such as tributyl citrate and acetyl tributyl citrate; epoxy plasticizers such as epoxidized soybean oil and epoxidized linseed oil; isophthalic acid ester plasticizers such as di(butoxyethoxyethyl) phthalate, dibutoxyethyl isophthalate, di(butoxyethoxyethyl) isophthalate, dimethoxyethyl phthalate, dibutyl phthalate, dioctyl phthalate, diisononyl phthalate, diisodecyl phthalate, diundecyl phthalate, butyl benzyl phthalate, dimethoxyethyl phthalate, diethoxyethyl phthalate, dibutoxyethyl phthalate, di(2-ethylhexyl) phthalate, diisobutyl phthalate, diheptyl phthalate, dicyclohexyl phthalate, diphenyl phthalate, butyl benzyl phthalate, di(2-ethylhexyl) isophthalate, and diisooctyl isophthalate; tetrahydrophthalic acid ester plasticizers such as di(2-ethylhexyl) tetrahydrophthalate, di-n-octyl tetrahydrophthalate, and diisodecyl tetrahydrophthalate; adipic acid ester plasticizers such as dibutoxyethyl adipate, di(butoxyethoxyethyl) adipate, di-2-hexyl adipate, di(2-ethylhexyl) adipate, diisodecyl adipate, diisononyl adipate, and dibutyl adipate; sebacic acid ester plasticizers such as dibutoxyethyl sebacate, di(butoxyethoxyethyl) sebacate, di-n-butyl sebacate, di(2-ethylhexyl) sebacate, and di-2-ethylhexyl sebacate; azelaic acid ester plasticizers such as dibutoxyethyl azelate, di(butoxyethoxyethyl) azelate, di(2-ethylhexyl) azelate, diisooctyl azelate, di-n-hexyl azelate, and di-2-hexyl azelate; trimellitic acid ester plasticizers such as tri-2-ethylhexyl trimellitate; fumaric acid ester plasticizers such as dibutyl fumarate; oleic acid ester plasticizers such as butyl oleate; polyester plasticizers; and trimellitic acid derivatives such as tri(2-ethylhexyl) trimellitate, tri-n-octyl trimellitate, triisodecyl trimellitate, triisooctyl trimellitate, tri-n-hexyl trimellitate, triisononyl trimellitate, and triisodecyl trimellitate.

Moreover, the plasticizer may be a compound that is obtained through an esterification reaction of an alkane dicarboxylic acid, such as succinic acid, glutaric acid, adipic acid, suberic acid, or azelaic acid, and an alcohol including an ether bond in a molecule thereof, such as methoxytriethoxyethanol, methoxytetraethoxyethanol, butoxytriethoxyethanol, pentoxytetraethoxyethanol, ethoxytripropoxypropanol, or ethoxytetrapentoxypentanol, and that includes an alkyl chain having a carbon number of 4 or more. Of these examples, compounds that include an alkyl chain having a carbon number of 4 or more and that also include one or more polar groups selected from a phosphate group, a carbonyl group, and a hydroxy group are preferable plasticizers. In particular, phosphoric acid ester plasticizers are preferable, and 2-ethylhexyl diphenyl phosphate is more preferable as the plasticizer. Note that the carbon number of an alkyl chain included in the plasticizer may be 10 or less, but is not specifically limited thereto.

A compound that includes an alkyl chain having a carbon number of 4 or more and that also includes one or more polar groups selected from a phosphate group, a carbonyl group, and a structure represented by a general formula R—OH (R is a saturated or unsaturated hydrocarbon chain), which can suitably be used as the plasticizer, has high affinity with the (meth)acrylic acid ester monomer unit included in the polymer α, the (meth)acrylic acid ester monomer unit that can be included in the polymer β, the nitrile group-containing monomer unit included in the polymer β, and the nitrile group-containing monomer unit that can be included in the polymer γ, which is an optional component, and tends to accompany the binder component such as the polymers α and β in a binder composition having an organic solvent as a dispersion medium as a result of including a polar group. Accordingly, in a situation in which the binder composition is used to form an electrode mixed material layer, the plasticizer can be dispersed uniformly in the electrode mixed material layer and can be held well in the electrode mixed material layer. Moreover, in a situation in which an electrode including this electrode mixed material layer is used to form a secondary battery, the plasticizer is thought to have a low tendency to migrate into electrolyte solution. Therefore, when a compound that includes an alkyl chain having a carbon number of 4 or more and that also includes one or more polar groups selected from a phosphate group, a carbonyl group, and a structure represented by a general formula R—OH (R is a saturated or unsaturated hydrocarbon chain) is compounded as the plasticizer in the binder composition, it is possible to increase the flexibility of an obtained electrode well and to effectively inhibit deterioration of battery characteristics, such as rate characteristics and cycle characteristics, of an obtained secondary battery.

The molecular weight of the plasticizer is preferably 1,000 or less, and more preferably 900 or less, and is preferably 100 or more, and more preferably 200 or more. When the molecular weight of the plasticizer is not more than any of the upper limits set forth above, the flexibility of an obtained electrode can be further increased. Moreover, when the molecular weight of the plasticizer is not less than any of the lower limits set forth above, the peel strength of an obtained electrode can be further increased.

The decomposition potential of the plasticizer is preferably 3.5 V or higher, and more preferably 4.0 V or higher. Note that the decomposition potential can normally be 10 V or lower. When the decomposition potential of the plasticizer is not lower than any of the lower limits set forth above, the rate characteristics and cycle characteristics of an obtained secondary battery can be further enhanced.

Moreover, the plasticizer preferably has a higher boiling point than the organic solvent that is contained in the binder composition. Note that the boiling point of the plasticizer refers to the boiling point at 1 atm. When the boiling point of the plasticizer is higher than the boiling point of the organic solvent, it is possible to inhibit volatilization of the plasticizer during heated drying in production of an electrode and to cause the plasticizer to remain well in an electrode mixed material layer. The plasticizer is preferably a liquid substance at normal temperature (25° C.).

The content of the plasticizer in the binder composition when the total content of the binder component and the plasticizer is taken to be 100 mass % is preferably 0.1 mass % or more, more preferably 0.5 mass % or more, and even more preferably 1.2 mass % or more, and is preferably 30 mass % or less, more preferably 15 mass % or less, and even more preferably 12 mass % or less. When the content of the plasticizer is not less than any of the lower limits set forth above, the flexibility of an obtained electrode can be further increased. Moreover, when the content of the plasticizer is not more than any of the upper limits set forth above, the peel strength of an obtained electrode can be increased. Furthermore, when the content of the plasticizer is not more than any of the upper limits set forth above, the rate characteristics and cycle characteristics of an obtained secondary battery can be further enhanced.

<Organic Solvent>

The organic solvent of the presently disclosed binder composition may be an alcohol such as methanol, ethanol, n-propanol, isopropanol, n-butanol, isobutanol, t-butanol, pentanol, hexanol, heptanol, octanol, nonanol, decanol, or amyl alcohol, a ketone such as acetone, methyl ethyl ketone, or cyclohexanone, an ester such as ethyl acetate or butyl acetate, an ether such as diethyl ether, dioxane, or tetrahydrofuran, an amide polar organic solvent such as N,N-dimethylformamide or N-methyl-2-pyrrolidone (NMP), an aromatic hydrocarbon such as toluene, xylene, chlorobenzene, orthodichlorobenzene, or paradichlorobenzene, or the like, for example. One of these organic solvents may be used individually, or two or more of these organic solvents may be used as a mixture.

Of these examples, NMP is preferable as the organic solvent.

<Other Components>

Other than the components set forth above, the presently disclosed binder composition may contain components such as a reinforcing material, a leveling agent, a viscosity modifier, and an additive for electrolyte solution. These other components are not specifically limited so long as they do not affect battery reactions and may be selected from commonly known components such as those described in WO2012/115096A1. One of these components may be used individually, or two or more of these components may be used in combination in a freely selected ratio.

<Production of Binder Composition>

The presently disclosed binder composition can be produced by using a known method to mix the above-described polymers α and β serving as the binder component, the plasticizer, the organic solvent, and other optional components. Specifically, the binder composition can be produced by mixing the above-described components using a mixer such as a ball mill, a sand mill, a bead mill, a pigment disperser, a grinding machine, an ultrasonic disperser, a homogenizer, a planetary mixer, or a FILMIX. Note that the solid content concentration of the binder composition is not specifically limited and can, for example, be not less than 5 mass % and not more than 60 mass %.

(Slurry Composition for Non-Aqueous Secondary Battery Electrode)

The presently disclosed slurry composition for a non-aqueous secondary battery electrode contains an electrode active material, a conductive material, and the binder composition set forth above and optionally further contains other components. In other words, the presently disclosed slurry composition contains an electrode active material, a conductive material, and the above-described polymers α and β, plasticizer, and organic solvent, and optionally further contains other components. As a result of containing the binder composition set forth above, the presently disclosed slurry composition makes it possible to simultaneously achieve, to high levels, both the formation of an electrode having excellent flexibility and uniformity and the enhancement of rate characteristics and cycle characteristics of a secondary battery including the obtained electrode.

Although the following describes, as one example, a case in which the slurry composition for a secondary battery electrode is a slurry composition for a lithium ion secondary battery positive electrode, the presently disclosed slurry composition for a secondary battery electrode is not limited to the following example.

<Electrode Active Material>

The electrode active material is a material that gives and receives electrons in an electrode of a secondary battery. A material that can occlude and release lithium is normally used as a positive electrode active material for a lithium ion secondary battery.

More specifically, the positive electrode active material for a lithium ion secondary battery may be a known positive electrode active material such as lithium-containing cobalt oxide ($LiCoO_2$), lithium manganate ($LiMn_2O_4$), lithium-containing nickel oxide ($LiNiO_2$), a lithium-containing complex oxide of Co—Ni—Mn ($Li(Co\ Mn\ Ni)O_2$), a lithium-containing complex oxide of Ni—Mn—Al, a lithium-containing complex oxide of Ni—Co—Al, olivine-type lithium iron phosphate ($LiFePO_4$), olivine-type lithium manganese phosphate ($LiMnPO_4$), an $Li_2MnO_3$—$LiNiO_2$-based solid solution, a lithium-rich spinel compound represented by $Li_{1+x}Mn_{2-x}O_4$ ($0<x<2$), $Li[Ni_{0.17}Li_{0.2}Co_{0.07}Mn_{0.56}]O_2$, or $LiNi_{0.5}Mn_{1.5}O_4$ without any specific limitations.

The particle diameter of the positive electrode active material is not specifically limited and may be the same as that of a conventionally used positive electrode active material. The proportional content of the positive electrode active material in the slurry composition can, for example, be not less than 90 mass % and not more than 99 mass % when all solid content in the slurry composition is taken to be 100 mass %.

<Conductive Material>

The conductive material is for ensuring electrical contact among the electrode active material. The presently disclosed slurry composition preferably contains one or more carbon nanotubes (CNTs), which are a fibrous carbon material, as the conductive material. This is because the presently disclosed binder composition set forth above enables good dispersion of CNTs in the slurry composition and, as a consequence, can increase the dispersibility of other solid content, such as the electrode active material, in the slurry composition. The CNTs may be single-walled or multi-walled carbon nanotubes (multi-walled carbon nanotubes are inclusive of cup-stacked carbon nanotubes). The specific surface area of the CNTs is preferably 50 $m^2/g$ or more, more preferably 70 $m^2/g$ or more, and even more preferably 100 $m^2/g$ or more, and is preferably 400 $m^2/g$ or less, more preferably 350 $m^2/g$ or less, and even more preferably 300 $m^2/g$ or less. When the specific surface area of the CNTs is within any of the ranges set forth above, good dispersibility of the CNTs in the slurry composition can be ensured, and the viscosity of the slurry composition can be stabilized. Note that the "specific surface area" referred to in the present disclosure is the nitrogen adsorption specific surface area measured by the BET method.

Examples of conductive materials other than CNTs that may be further contained include conductive carbon materials such as carbon black (for example, acetylene black, Ketjenblack® (Ketjenblack is a registered trademark in Japan, other countries, or both), and furnace black), carbon nanohorns, milled carbon fiber obtained through pyrolysis and subsequent pulverization of polymer fiber, single-layer and multilayer graphene, and carbon non-woven fabric sheet obtained through pyrolysis of non-woven fabric made of polymer fiber; and fibers and foils of various metals. One of these conductive materials may be used individually, or two or more of these conductive materials may be used in combination. The particle diameter of the conductive material is not specifically limited and may be the same as that of a conventionally used conductive material. The proportional content of the conductive material in the slurry composition can, for example, be not less than 0.1 mass % and not more than 3 mass % when all solid content in the slurry composition is taken to be 100 mass %.

<Binder Composition>

The presently disclosed binder composition for a non-aqueous secondary battery electrode set forth above is used as the binder composition. The proportional content of the binder composition in the slurry composition can, for example, be not less than 0.1 mass % and not more than 5 mass % when all solid content in the slurry composition is taken to be 100 mass %.

<Other Components>

Examples of other components that may be contained in the slurry composition include, but are not specifically limited to, the same other components as may be contained in the presently disclosed binder composition. One other component may be used individually, or two or more other components may be used in combination in a freely selected ratio.

<Production Method of Slurry Composition>

The slurry composition set forth above can be produced by dissolving or dispersing the above-described components in an organic solvent, for example. More specifically, the presently disclosed slurry composition set forth above may be produced by dividing up an operation of adding the components to the organic solvent into a plurality of stages or may be produced by adding the required components to the organic solvent in a single operation. In a case in which the operation of adding the components to the organic solvent is divided into a plurality of stages, no specific limitations are placed on the order of addition and the combination of added components.

The method of mixing when the components are added to the organic solvent is not specifically limited and may be a mixing method using a mixer such as a ball mill, a sand mill, a bead mill, a pigment disperser, a grinding machine, an ultrasonic disperser, a homogenizer, a planetary mixer, or a FILMIX®.

The organic solvent may be any of the same organic solvents as can be contained in the presently disclosed binder composition. Moreover, the organic solvent contained in the binder composition may be used as the organic solvent that is used in production of the slurry composition. The total additive amount of each component that is added in production of the slurry composition is as described in detail in the "Binder composition for non-aqueous secondary battery electrode" and "Slurry composition for non-aqueous secondary battery electrode" sections.

The slurry composition may, for example, be produced by producing binder particle agglomerates containing the polymers α and β and the plasticizer and then using these binder particle agglomerates to produce the slurry composition as described below in the "Production method of slurry composition using binder particle agglomerates" section.

<<Production Method of Slurry Composition Using Binder Particle Agglomerates>>

In a method of producing the slurry composition using binder particle agglomerates, the slurry composition can be produced using binder particle agglomerates that are produced through spray drying of a water dispersion (hereinafter, also referred to as a "slurry for binder particles") that contains at least the plasticizer, the polymer α, and the polymer β and that optionally contains the polymer γ and other components. More specifically, binder particle agglomerates that are produced as described below may be mixed with the organic solvent, the electrode active material, the conductive material, and other optional components so as to obtain the slurry composition, for example.

[Production Method of Binder Particle Agglomerates]

In production of the binder particle agglomerates, the slurry for binder particles is first sprayed and dried in air hot. The device used to spray the slurry for binder particles may be an atomizer. Two examples of types of atomizers that may be used are rotating disk atomizers and pressurizing atomizers.

In the case of a rotating disk atomizer, the slurry for binder particles is fed to a central section of a disk that is rotating at high speed and the slurry for binder particles is expelled to outside of the disk through centrifugal force of the disk, and is thereby converted into the form of a spray. The rotation speed of the disk in rotating disk atomization is not specifically limited but is preferably not less than 5,000 rpm and not more than 30,000 rpm.

In the case of a pressurizing atomizer, the slurry for binder particles is pressurized and is expelled from a nozzle to thereby convert the slurry for binder particles into the form of a spray. The pressurizing atomizer may be of a pressurizing nozzle or a pressurizing two-fluid nozzle type. In the case of a pressurizing two-fluid nozzle atomizer, the pressure of air that is expelled from an air nozzle (dispersing air pressure) in order to perform fine adjustment of spraying of the slurry for binder particles is not specifically limited but is preferably not less than 0.01 MPa and not more than 0.5 MPa.

The hot air temperature during spray drying may be not lower than 80° C. and not higher than 250° C., for example. Also note that the method by which hot air is blow in during spray drying is not specifically limited and can be a known method.

(Electrode for Non-Aqueous Secondary Battery)

The presently disclosed electrode for a non-aqueous secondary battery includes an electrode mixed material layer that contains the polymer α and the polymer β as a binder component, a plasticizer, an electrode active material, and a conductive material. Moreover, the presently disclosed electrode for a non-aqueous secondary battery can be an electrode that is obtained by forming this electrode mixed material layer on a current collector. The electrode mixed material layer may be formed using the presently disclosed slurry composition or may be formed by another method so long as it contains the essential components described above. Note that the electrode mixed material layer may optionally contain the polymer γ and other components besides the polymer γ. As a result of including an electrode mixed material layer that satisfies the chemical composition described above, the presently disclosed electrode for a non-aqueous secondary battery has excellent flexibility and uniformity and can enhance the rate characteristics and cycle characteristics of a secondary battery.

The preferred ratio of each component contained in the electrode mixed material layer is the same as the preferred ratio of that component in the slurry composition. Note that the polymer α is a particulate polymer and that the particulate form thereof can be confirmed when the electrode mixed material layer is observed under magnification. The polymer β is preferably present in a form covering at least part of the surface of a solid component such as the electrode active material. Moreover, the polymer γ, which is an optional component, is preferably present in a form adjacent to CNTs. Details pertaining to the polymers α to γ are as described in detail in the "Binder composition" section.

<Production Method of Electrode>

The presently disclosed electrode for a non-aqueous secondary battery can be produced, for example, through a step of applying, onto a current collector, a slurry composition that contains the specific components described above (application step) and a step of drying the slurry composition that has been applied onto the current collector so as to form an electrode mixed material layer on the current collector (drying step).

[Application Step]

The slurry composition can be applied onto the current collector by any commonly known method without any specific limitations. Specific examples of application methods that can be used include doctor blading, dip coating, reverse roll coating, direct roll coating, gravure coating, extrusion coating, and brush coating. During application, the slurry composition may be applied onto one side or both sides of the current collector. The thickness of the slurry coating on the current collector after application but before drying may be set as appropriate in accordance with the thickness of the electrode mixed material layer to be obtained after drying.

The current collector onto which the slurry composition is applied is a material having electrical conductivity and electrochemical durability. Specifically, the current collector may, for example, be made of iron, copper, aluminum, nickel, stainless steel, titanium, tantalum, gold, platinum, or the like. One of these materials may be used individually, or two or more of these materials may be used in combination in a freely selected ratio.

[Drying Step]

The slurry composition on the current collector may be dried by any commonly known method without any specific limitations. Examples of drying methods that can be used include drying by warm, hot, or low-humidity air; drying in a vacuum; and drying by irradiation with infrared light, electron beams, or the like. Through drying of the slurry composition on the current collector in this manner, an electrode mixed material layer can be formed on the current collector to thereby obtain an electrode for a secondary battery that includes the current collector and the electrode mixed material layer.

After the drying step, the electrode mixed material layer may be further subjected to a pressing process, such as mold pressing or roll pressing. The pressing process can improve close adherence between the electrode mixed material layer and the current collector. Furthermore, in a case in which the electrode mixed material layer contains a curable polymer, the polymer is preferably cured after the electrode mixed material layer has been formed.

(Non-Aqueous Secondary Battery)

The presently disclosed non-aqueous secondary battery includes the presently disclosed electrode for a non-aqueous secondary battery. More specifically, the presently disclosed non-aqueous secondary battery includes a positive electrode, a negative electrode, an electrolyte solution, and a separator and has the presently disclosed electrode for a non-aqueous secondary battery as at least one of the positive electrode and the negative electrode. The presently disclosed non-aqueous secondary battery has excellent battery characteristics such as rate characteristics and cycle characteristics as a result of including the presently disclosed electrode for a non-aqueous secondary battery.

Note that the presently disclosed non-aqueous secondary battery is preferably a non-aqueous secondary battery in which the presently disclosed electrode for a non-aqueous secondary battery is used as a positive electrode. Although the following describes, as one example, a case in which the secondary battery is a lithium ion secondary battery, the presently disclosed secondary battery is not limited to the following example.

<Electrodes>

Examples of electrodes other than the electrode for a non-aqueous secondary battery set forth above that can be used in the presently disclosed non-aqueous secondary battery include known electrodes that are used in production of non-aqueous secondary batteries without any specific limitations. Specifically, an electrode obtained by forming an electrode mixed material layer on a current collector by a known production method may be used as an electrode other than the electrode for a non-aqueous secondary battery set forth above.

<Electrolyte Solution>

The electrolyte solution is normally an organic electrolyte solution obtained by dissolving a supporting electrolyte in an organic solvent. The supporting electrolyte of the lithium ion secondary battery may, for example, be a lithium salt. Examples of lithium salts that may be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable because they readily dissolve in solvents and exhibit a high degree of dissociation, with $LiPF_6$ being particularly preferable. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of organic solvents that can suitably be used include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having a high permittivity and a wide stable potential region, and a mixture of ethylene carbonate and diethyl carbonate is more preferable.

The concentration of the electrolyte in the electrolyte solution may be adjusted as appropriate. Moreover, known additives such as vinylene carbonate may be added to the electrolyte solution.

<Separator>

The separator is not specifically limited and may be any of those described in JP2012-204303A, for example. Of these separators, a microporous membrane made of polyolefinic (polyethylene, polypropylene, polybutene, or polyvinyl chloride) resin is preferred because such a membrane can reduce the total thickness of the separator, which increases the ratio of electrode active material in the secondary battery, and consequently increases the volumetric capacity.

<Production Method of Non-Aqueous Secondary Battery>

The presently disclosed non-aqueous secondary battery may be produced, for example, by stacking the positive electrode and the negative electrode with the separator in-between, performing rolling, folding, or the like of the resultant laminate as necessary in accordance with the battery shape, placing the laminate in a battery container, injecting the electrolyte solution into the battery container, and sealing the battery container. In order to prevent pressure increase inside the secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion in the polymer constituted by a monomer unit that is formed through polymerization of a given monomer is normally, unless otherwise specified, the same as the ratio (charging ratio) of the given monomer among all monomers used in polymerization of the polymer.

In the examples and comparative examples, the attributes of a plasticizer, the NMP solubility of polymers α to γ, the iodine value of a polymer γ, the weight-average molecular weight of polymers β and γ, and the proportion of NMP-insoluble content in a mixture of polymers α and β were measured or confirmed as described below. Moreover, in the examples and comparative examples, electrode flexibility, electrode uniformity, electrode mixed material layer peel strength, and secondary battery initial capacity, rate characteristics, and cycle characteristics were evaluated as described below.

<Attributes of Plasticizer>

The molecular weight of a plasticizer was measured by LC-MS (Liquid Chromatography Mass Spectrometry), and the decomposition potential of the plasticizer was measured by CV (Cyclic Voltammetry) described below.

A plasticizer solution was obtained by adding the plasticizer to an $LiPF_6$ solution of 1 M in concentration (solvent: ethylene carbonate (EC)/ethyl methyl carbonate (EMC)=3/7 (volume ratio)) such that the solid content concentration was 0.2 mass %. Metal Li and glassy carbon as reference electrodes were placed in this plasticizer solution, and the onset point of a rise in the current value when the voltage was changed at an sweep rate of 2 mV/s was taken to be the decomposition potential.

<NMP Solubility of Polymer α (Confirmation of Insolubility)>

A polymer α produced in each example or comparative example was vacuum dried in a 25° C. environment for 24 hours to obtain dry polymer (mass: W1 g). The obtained dry polymer was left in 60° C. NMP for 72 hours and was then filtered at 200 mesh (75 μm) so as to separate insoluble content. The insoluble content was washed with methanol and was then dried in a 25° C. environment for 24 hours to obtain dry insoluble content (mass: W2 g). W1 and W2 were used to calculate the amount of NMP-insoluble content in the polymer α (=W2/W1×100 (mass %)). The amount of NMP-insoluble content was confirmed to be 70 mass % or more for every polymer α produced in the examples and comparative examples. Accordingly, the used polymer α was confirmed to be an "insoluble polymer".

<NMP Solubility of Polymers β and γ (Confirmation of High Solubility)>

The NMP solubility of polymers β and γ was confirmed by the following procedure.

A polymer β or γ was caused to precipitate through dropwise addition, into 1 L of methanol, of 25 g of a composition containing the polymer β or γ in N-methyl-2-pyrrolidone (NMP) that was produced in each example or comparative example. The precipitated polymer β or γ was vacuum dried in a 25° C. environment for 24 hours to obtain dry polymer β or γ (mass: W1 g). The obtained dry polymer β or γ was left in 60° C. NMP for 72 hours and was then filtered at 200 mesh (75 μm) so as to separate insoluble content. The insoluble content was washed with methanol and was then dried in a 25° C. environment for 24 hours to obtain dry insoluble content (mass: W2 g). W1 and W2 were used to calculate the amount of NMP-insoluble content in the polymer β or γ (=W2/W1×100 (mass %)). The amount of NMP-insoluble content was confirmed to be 50 mass % or less for every polymer β or γ produced in the examples. Moreover, the amount of NMP-insoluble content was confirmed to be 50 mass % or less for every polymer β or γ in the Comparative Examples with the exception of a polymer β produced in Comparative Example 1.

<Iodine Value of Polymer γ>

After coagulating 100 g of a water dispersion (dispersion prior to solvent exchange with NMP) of a polymer γ produced in each example or comparative example in 1 L of methanol, 12 hours of vacuum drying was performed at a temperature of 60° C. The iodine value of the obtained dry highly soluble polymer γ was measured in accordance with JIS K6235 (2006).

<Weight-Average Molecular Weight of Polymers β and γ>

The weight-average molecular weight of polymers β and γ produced in the examples and comparative examples was measured by gel permeation chromatography (GPC). Specifically, a calibration curve for a standard substance was prepared using polystyrene, and the weight-average molecular weight was calculated as a standard substance-equivalent value. The measurement conditions were as follows.

<<Measurement Conditions>>

Measurement Apparatus

Column: TSKgel α-M×2 (ø7.8 mm I.D.×30 cm×2 columns; produced by Tosoh Corporation)

Measurement Conditions

Eluent: Dimethylformamide (50 mM lithium bromide, 10 mM phosphoric acid)

Flow rate: 0.5 mL/min

Sample concentration: Approximately 0.5 g/L (solid content concentration)

Injection volume: 200 μL

Column temperature: 40° C.

Detector: Differential refractive index detector RI (HLC-8320 GPC RI detector produced by Tosoh® Corporation)

Detector conditions: RI: Pol (+), Res (1.0 s)

Molecular weight marker: Standard Polystyrene Kit PStQuick K produced by Tosoh® Corporation <Proportion of NMP-Insoluble Content in Mixture of Polymers α and β>

In an environment having a temperature of 25° C., polymers α and β that were produced or prepared in each example or comparative example, or components that were used instead thereof, were added to NMP solvent in the mixing ratio described in that example so as to have a solid content concentration of 8% to thereby produce 100 g of a polymer α/β-NMP mixture. The produced mixture was filtered through a screen at 80 mesh (180 μm), the filtration residue was weighed, and the mass of insoluble content was calculated as a proportion (mass %) relative to the total amount of solid content that had been added.

<Electrode Flexibility>

A rod was placed at a positive electrode mixed material layer-side of a positive electrode for a lithium ion secondary battery produced in each example or comparative example, the positive electrode was wound around the rod, and the presence or absence of cracking of the positive electrode mixed material layer was evaluated. This was performed using rods of different diameters. When the positive electrode can be wound around a rod of smaller diameter without cracking of the positive electrode mixed material layer, this indicates that the positive electrode has higher flexibility and better windability. The flexibility of the electrode (positive electrode) was evaluated by the following standard in accordance with the diameter of a thinnest rod with which cracking of the positive electrode mixed material layer did not occur.

A: No cracking even upon winding around rod of 1.15 mm in diameter

B: No cracking even upon winding around rod of 1.40 mm in diameter

C: No cracking even upon winding around rod of 2.00 mm in diameter

D: No cracking even upon winding around rod of 3.00 mm in diameter

<Electrode Uniformity>

Electrode uniformity was evaluated based on the uniformity of thickness of an electrode mixed material layer. Variation of thickness was evaluated for when thickness was measured at 5 points in 10 $cm^2$ of a mixed material layer of a positive electrode for a lithium ion secondary battery produced in each example or comparative example. A smaller thickness variation indicates that uniform movement of lithium occurs more easily and resistance is lower inside a battery.

A: In-plane variation of less than 1.5%

B: In-plane variation of not less than 1.5% and less than 3%

C: In-plane variation of not less than 3% and less than 5%

D: In-plane variation of 5% or more

<Peel Strength of Electrode Mixed Material Layer>

A positive electrode for a lithium ion secondary battery produced in each example or comparative example was cut out as a rectangle of 100 mm in length and 10 mm in width to obtain a test specimen. The surface of the test specimen at which a positive electrode mixed material layer was present was placed facing downward and cellophane tape (tape prescribed by JIS Z1522) was affixed to the surface of the positive electrode mixed material layer. One end of the current collector was pulled in a perpendicular direction, and the stress when the current collector was peeled off at a speed of 100 mm/min was measured (note that the cellophane tape was fixed to a test stage). Three measurements were made in this manner. An average value of the measurements was determined, was taken to be the peel strength, and was evaluated by the following standard. A larger value for the peel strength indicates that there is stronger close adherence of the positive electrode mixed material layer and the current collector and that the electrode (positive electrode) mixed material layer has higher peel strength.

A: Peel strength of 30 N/m or more

B: Peel strength of not less than 25 N/m and less than 30 N/m

C: Peel strength of not less than 20 N/m and less than 25 N/m

D: Peel strength of less than 20 N/m

<Initial Capacity of Secondary Battery>

A lithium ion secondary battery produced in each example or comparative example was left at a temperature of 25° C. for 5 hours after injection of electrolyte solution. Next, the lithium ion secondary battery was charged to a cell voltage of 3.65 V by a 0.2 C constant-current method at a temperature of 25° C. and was then subjected to 12 hours of aging at a temperature of 60° C. The lithium ion secondary battery was subsequently discharged to a cell voltage of 3.00 V by a 0.2 C constant-current method at a temperature of 25° C. Thereafter, CC-CV charging of the lithium ion secondary battery was performed with a 0.2 C constant current (upper limit cell voltage 4.20 V) and CC discharging of the lithium ion secondary battery was performed to a cell voltage of 3.00 V with a 0.2 C constant current. This charging and discharging at 0.2 C was repeated three times. The discharge capacity of the 3rd cycle was taken to be the initial capacity, and a value of initial capacity/theoretical capacity was evaluated by the following standard. A larger value indicates higher initial discharge capacity.

A: Initial capacity/theoretical capacity of 0.78 or more

B: Initial capacity/theoretical capacity of not less than 0.75 and less than 0.78

C: Initial capacity/theoretical capacity of not less than 0.73 and less than 0.75

D: Initial capacity/theoretical capacity of less than 0.73

<Rate Characteristics of Secondary Battery>

A lithium ion secondary battery produced in each example or comparative example was left at a temperature of 25° C. for 5 hours after injection of electrolyte solution. Next, the lithium ion secondary battery was charged to a cell voltage of 3.65 V by a 0.2 C constant-current method at a temperature of 25° C. and was then subjected to 12 hours of aging at a temperature of 60° C. The lithium ion secondary battery was subsequently discharged to a cell voltage of 3.00 V by a 0.2 C constant-current method at a temperature of 25° C. Thereafter, CC-CV charging of the lithium ion secondary battery was performed with a 0.2 C constant current (upper limit cell voltage 4.20 V) and CC discharging of the lithium ion secondary battery was performed to a cell voltage of 3.00 V with a 0.2 C constant current. This charging and discharging at 0.2 C was repeated three times.

Next, 0.2 C constant-current charging and discharging were performed between cell voltages of 4.20 V and 3.00 V in an environment having a temperature of 25° C., and the discharge capacity at this time was defined as C0. Thereafter, CC-CV charging with a 0.2 C constant current was performed in the same manner, CC discharging was then performed to 3.00 V with a 2.00 constant current in an environment having a temperature of 25° C., and the discharge capacity at this time was defined as C1. A proportion (percentage; capacity maintenance rate) of the discharge capacity (C1) at 2.00 relative to the discharge capacity (C0) at 0.2 C, which is expressed by (C1/C0)×100(%), was determined as a rate characteristic and was evaluated by the following standard. A larger value for this capacity maintenance rate indicates less reduction of discharge capacity at high current and lower internal resistance (i.e., better rate characteristics).

A: Capacity maintenance rate of 75% or more

B: Capacity maintenance rate of not less than 73% and less than 75%

C: Capacity maintenance rate of not less than 70% and less than 73%

D: Capacity maintenance rate of less than 70%

<Cycle Characteristics of Secondary Battery>

A lithium ion secondary battery produced in each example or comparative example was left at a temperature of 25° C. for 5 hours after injection of electrolyte solution. Next, the lithium ion secondary battery was charged to a cell voltage of 3.65 V by a 0.2 C constant-current method at a temperature of 25° C. and was then subjected to 12 hours of aging at a temperature of 60° C. The lithium ion secondary battery was subsequently discharged to a cell voltage of 3.00 V by a 0.2 C constant-current method at a temperature of 25° C. Thereafter, CC-CV charging of the lithium ion secondary battery was performed with a 0.2 C constant current (upper limit cell voltage 4.20 V) and CC discharging of the lithium ion secondary battery was performed to a cell voltage of 3.00 V with a 0.2 C constant current. This charging and discharging at 0.2 C was repeated three times. Thereafter, the lithium ion secondary battery was subjected to 100 cycles of a charge/discharge operation at a cell voltage of 4.20 V to 3.00 V and a charge/discharge rate of 1.0 C in an environment having a temperature of 35° C. The discharge capacity of the 1st cycle was defined as X1 and the discharge capacity of the 100th cycle was defined as X2. The discharge capacity X1 and the discharge capacity X2 were used to determine a capacity maintenance rate expressed by (X2/X1)×100(%) (i.e., a proportion of the discharge capacity of the 100th cycle relative to the discharge capacity of the Pt cycle) as a cycle characteristic, and this capacity maintenance rate was evaluated by the following standard. A larger value for this capacity maintenance rate indicates better cycle characteristics.

A: Capacity maintenance rate of 93% or more

B: Capacity maintenance rate of not less than 90% and less than 93%

C: Capacity maintenance rate of not less than 87% and less than 90%

D: Capacity maintenance rate of less than 87%

Example 1

<Production of Polymer α>

A 1 L septum-equipped flask that included a stirrer was charged with 100 parts of deionized water, the gas phase was purged with nitrogen gas, and the temperature was raised to 80° C. Thereafter, 0.3 parts of ammonium persulfate (APS) as a polymerization initiator was dissolved in 5.7 parts of deionized water and was then added into the flask.

Meanwhile, a monomer composition was obtained in a separate vessel by mixing 40 parts of deionized water, 0.18 parts of sodium polyoxyethylene alkyl ether sulfate (LATEMUL E-118B produced by Kao Corporation) as an emulsifier, 55 parts of methyl methacrylate and 39 parts of n-butyl acrylate as (meth)acrylic acid ester monomers, 5 parts of methacrylic acid as an ethylenically unsaturated acid monomer, and 1 part of allyl methacrylate as a cross-linkable monomer. The monomer composition was continuously added into the 1 L septum-equipped flask over 1 hour to perform polymerization. The reaction was carried out at 80°

C. during the addition. Once the addition was complete, a further 1 hour of stirring was performed at 80° C. to complete the reaction.

Next, an appropriate amount of NMP was added to the resultant water dispersion of a polymer α so as to obtain a mixture. Water and excess NMP were subsequently removed from the mixture through distillation under reduced pressure at 90° C. to obtain an NMP dispersion (solid content concentration: 8%) of the polymer α.

The obtained NMP dispersion of the polymer α was dried at 120° C. for 1 hour to produce a film of 0.2 mm to 0.5 mm in thickness. By confirming that the polymer α maintained a particulate form using a scanning electron microscope (SEM), it was confirmed that the polymer α was dispersed in a particulate form in the dispersion medium (NMP).

<Production of Polymer β1>

A reactor A having a mechanical stirrer and a condenser attached thereto was charged with 85 parts of deionized water and 0.2 parts of sodium dodecylbenzenesulfonate in a nitrogen atmosphere. The contents were heated to 55° C. under stirring, and then a 5.0% aqueous solution of 0.3 parts of potassium persulfate was added into the reactor A. Next, separately to the reactor A, a vessel B having a mechanical stirrer attached thereto was charged with 92 parts of acrylonitrile as a nitrile group-containing monomer, 1 part of acrylamide as an amide group-containing monomer, 2 parts of methacrylic acid as an ethylenically unsaturated acid monomer, 5 parts of butyl acrylate as a (meth)acrylic acid ester monomer, 0.6 parts of sodium dodecylbenzenesulfonate, 0.035 parts of tert-dodecyl mercaptan, 0.4 parts of polyoxyethylene lauryl ether, and 80 parts of deionized water in a nitrogen atmosphere, and these materials were stirred and emulsified to produce a monomer mixture. This monomer mixture was added into the reactor A at a constant rate over 5 hours while in a stirred and emulsified state and was caused to react until the polymerization conversion rate reached 95% so as to yield a water dispersion of a nitrile polymer (polymer β1) including mainly acrylonitrile units (92 mass %). Next, an appropriate amount of NMP was added to the resultant water dispersion of the polymer β1 so as to obtain a mixture. Water and excess NMP were subsequently removed from the mixture through distillation under reduced pressure at 90° C. to obtain an NMP solution (solid content concentration: 8%) of the polymer β1.

<Production of Polymer γ1>

An autoclave equipped with a stirrer was charged with 240 parts of deionized water, 25 parts of sodium alkylbenzene sulfonate as an emulsifier, 24 parts of acrylonitrile as a nitrile group-containing monomer, 43 parts of styrene as an aromatic vinyl monomer, and 4 parts of methacrylic acid as an ethylenically unsaturated acid monomer in this order and was internally purged with nitrogen. Thereafter, 29 parts of 1,3-butadiene was injected as a conjugated diene monomer, 0.25 parts of ammonium persulfate was added as a polymerization initiator, and a polymerization reaction was carried out at a reaction temperature of 40° C. to yield a copolymer including a nitrile group-containing monomer unit, an aromatic vinyl monomer unit, an ethylenically unsaturated acid monomer unit, and a conjugated diene monomer unit. The iodine value of the obtained copolymer (pre-hydrogenation polymer), measured as previously described, was 140 g/100 g. The polymerization conversion rate was 85%.

Deionized water was added to the pre-hydrogenation polymer so as to obtain 400 mL of a solution (total solid content: 48 g) that was adjusted to a total solid content concentration of 12 mass %. This solution was loaded into a 1 L autoclave equipped with a stirrer. Nitrogen gas was caused to flow for 10 minutes in order to remove oxygen dissolved in the solution. Thereafter, 50 mg of palladium acetate was dissolved in 180 ml of deionized water to which nitric acid had been added in an amount of 4 molar equivalents relative to the palladium (Pd) and was then added into the autoclave as a hydrogenation reaction catalyst. The system was purged twice with hydrogen gas, the contents of the autoclave were subsequently heated to 50° C. in a state in which the pressure was raised to a gauge pressure of 3 MPa with hydrogen gas, and a hydrogenation reaction (first stage hydrogenation reaction) was carried out for 6 hours.

Next, the inside of the autoclave was restored to atmospheric pressure, and then 25 mg of palladium acetate was dissolved in 60 mL of water to which nitric acid had been added in an amount of 4 molar equivalents relative to the Pd and was further added into the autoclave as a hydrogenation reaction catalyst. The system was purged twice with hydrogen gas, the contents of the autoclave were subsequently heated to 50° C. in a state in which the pressure was raised to a gauge pressure of 3 MPa with hydrogen gas, and a hydrogenation reaction (second stage hydrogenation reaction) was carried out for 6 hours.

Thereafter, the contents were restored to normal temperature, the system was converted to a nitrogen atmosphere, and then an evaporator was used to perform concentrating to a solid content concentration of 40%, and thereby yield a water dispersion of a polymer γ1 as a polymer γ.

An N-methylpyrrolidone (NMP) dispersion of the polymer γ1 was then obtained by adding 320 parts of NMP as a solvent to 100 parts of the water dispersion of the polymer γ1 obtained as described above and then evaporating water under reduced pressure.

<Production of Slurry Composition for Secondary Battery Positive Electrode>

In this example, a slurry composition was produced in accordance with a slurry composition production method I (denoted as "I" in Table 1) that involved the following operations.

[Preliminary Mixing Step]

A preliminary mixture was obtained by adding 1 part of CNTs (specific surface area measured by BET method: 150 $m^2/g$; multi-walled type) as a conductive material and a specific amount of the polymer γ1 to a disper blade, further adding NMP (boiling point: 204° C.) as an organic solvent so as to adjust the solid content concentration to 4 mass %, and performing 10 minutes of stirred mixing thereof at a temperature of 25±3° C. and a rotation speed of 3,000 rpm.

[Main Mixing Step]

A slurry composition for a positive electrode having a viscosity of 3,600 mPa·s as measured by a B-type viscometer under conditions of 60 rpm (M4 rotor) and 25±3° C. was obtained by adding 97 parts of an active material NMC532 based on a lithium complex oxide of Co—Ni—Mn ($LiNi_{5/10}Co_{2/10}Mn_{3/10}O_2$) as a positive electrode active material, 0.15 parts of 2-ethylhexyl diphenyl phosphate as a plasticizer, and specific amounts of the polymer α and the polymer β to the preliminary mixture obtained in the above-described step, further adding NMP as necessary, and performing stirred mixing at a temperature of 25±3° C. and a rotation speed of 50 rpm.

Note that in the preliminary mixing step and the main mixing step, the total amount of the binder component (i.e., polymers α to γ) and the plasticizer was adjusted to 2 parts relative to 97 parts by mass of the positive electrode active material.

Also note that the amount of the binder component and the amount of the plasticizer were adjusted such that the amount of the plasticizer was 7.5 mass % when the total mass of the plasticizer and the binder component was taken to be 100 mass %.

Furthermore, with regards to the amount of the binder component (i.e., polymers α to γ), the amounts of the polymers were adjusted such that, when the content of the binder component was taken to be 100 mass %, the content (a) of the polymer α was 19 mass %, the content (b) of the polymer β was 78 mass %, and the content (c) of the polymer γ was 3 mass %.

<Production of Positive Electrode>

The slurry composition for a positive electrode obtained as described above was applied onto aluminum foil of 20 μm in thickness serving as a current collector by a comma coater such as to have a coating weight of 20±0.5 mg/cm$^2$.

The aluminum foil was conveyed inside an oven having a temperature of 100° C. for 2 minutes and an oven having a temperature of 130° C. for 2 minutes at a speed of 200 mm/min so as to dry the slurry composition on the aluminum foil, and thereby obtain a positive electrode web having a positive electrode mixed material layer formed on the current collector.

The positive electrode mixed material layer-side of the produced positive electrode web was subsequently roll pressed with a line pressure of 14 t (tons) in an environment having a temperature of 25±3° C. so as to obtain a positive electrode having a positive electrode mixed material layer density of 3.50 g/cm$^3$. The obtained positive electrode was used to evaluate the peel strength of the positive electrode mixed material layer by the previously described method. The result is shown in Table 1.

<Production of Binder Composition for Negative Electrode>

A 5 MPa pressure-resistant vessel equipped with a stirrer was charged with 64 parts of styrene, 33 parts of 1,3-butadiene, 2 parts of itaconic acid, 1 part of 2-hydroxyethyl acrylate, 0.3 parts of t-dodecyl mercaptan as a molecular weight modifier, 5 parts of sodium dodecylbenzenesulfonate as an emulsifier, 150 parts of deionized water, and 1 part of potassium persulfate as a polymerization initiator. These materials were sufficiently stirred and were then heated to a temperature of 55° C. to initiate polymerization. Cooling was performed to quench the reaction at the point at which monomer consumption reached 95.0%. A water dispersion of a polymer that was obtained in this manner was adjusted to a pH of 8 through addition of 5% sodium hydroxide aqueous solution. Unreacted monomer was subsequently removed through thermal-vacuum distillation. Thereafter, cooling was performed to a temperature of 30° C. or lower to yield a water dispersion containing a binder for a negative electrode.

<Production of Slurry Composition for Negative Electrode>

A planetary mixer was charged with 48.75 parts of artificial graphite (theoretical capacity: 360 mAh/g) and 48.75 parts of natural graphite (theoretical capacity: 360 mAh/g) as negative electrode active materials and 1 part in terms of solid content of carboxymethyl cellulose as a thickener. These materials were diluted to a solid content concentration of 60% with deionized water and were subsequently kneaded at a rotation speed of 45 rpm for 60 minutes. Thereafter, 1.5 parts in terms of solid content of the binder composition for a negative electrode obtained as described above was added and was kneaded therewith at a rotation speed of 40 rpm for 40 minutes. Deionized water was then added to adjust the viscosity to 3,000±500 mPa·s (measured by B-type viscometer at 25° C. and 60 rpm), and thereby produce a slurry composition for a negative electrode.

<Production of Negative Electrode>

The slurry composition for a negative electrode was applied onto the surface of copper foil of 15 μm in thickness serving as a current collector by a comma coater such as to have a coating weight of 11±0.5 mg/cm$^2$. The copper foil with the slurry composition for a negative electrode applied thereon was subsequently conveyed inside an oven having a temperature of 80° C. for 2 minutes and an oven having a temperature of 110° C. for 2 minutes at a speed of 400 mm/min so as to dry the slurry composition on the copper foil, and thereby obtain a negative electrode web having a negative electrode mixed material layer formed on the current collector.

The negative electrode mixed material layer-side of the produced negative electrode web was subsequently roll pressed with a line pressure of 11 t (tons) in an environment having a temperature of 25±3° C. so as to obtain a negative electrode having a negative electrode mixed material layer density of 1.60 g/cm$^3$.

<Preparation of Separator for Secondary Battery>

A separator made of a single layer of polypropylene (#2500 produced by Celgard, LLC.) was used.

<Production of Non-Aqueous Secondary Battery>

The negative electrode, positive electrode, and separator described above were used to produce a single-layer laminate cell (initial design discharge capacity equivalent to 40 mAh) and were arranged inside aluminum packing. The aluminum packing was then filled with an $LiPF_6$ solution of 1.0 M in concentration (solvent:mixed solvent of ethylene carbonate (EC)/diethyl carbonate (DEC)=3/7 (volume ratio); additive: containing 2 volume % (solvent ratio) of vinylene carbonate) as an electrolyte solution. The aluminum packing was then closed by heat sealing at a temperature of 150° C. to tightly seal an opening of the aluminum packing, and thereby produce a lithium ion secondary battery.

This lithium ion secondary battery was used to evaluate the initial capacity, rate characteristics, and cycle characteristics as previously described. The results are shown in Table 1.

Note that the presence of a particulate polymer in the positive electrode mixed material layer of the obtained secondary battery was confirmed through SEM observation.

Example 2

In this example, a slurry composition was produced in accordance with a slurry composition production method II (denoted as "II" in Table 1) that involved the following operations.

A mixture (slurry for binder particles) obtained by mixing the water dispersion of the polymer α, the water dispersion of the polymer β1, and the water dispersion of the polymer γ1 obtained in Example 1 with 2-ethylhexyl diphenyl phosphate as a plasticizer in proportions indicated in Table 1 was spray dried using a spray dryer (Niro produced by GEA) so as to produce binder particle agglomerates.

NMP was used to adjust 2 parts of the obtained binder particle agglomerates to a solid content concentration of 6%, and then 1 part of CNTs (specific surface area measured by BET method: 150 m$^2$/g) as a conductive material, 97 parts of an active material NMC532 based on a lithium complex oxide of Co—Ni—Mn ($LiNi_{5/10}Co_{2/10}Mn_{3/10}O_2$) as a positive electrode active material, and NMP as an organic solvent were added, and 60 minutes of stirred mixing was performed at a temperature of 25±3° C. so as to disperse the binder, the conductive material, and the active material. This yielded a slurry composition for a positive electrode having a viscosity of 3,600 m·Pas as measured by a B-type viscometer under conditions of a rotation speed of 60 rpm (M4 rotor) and 25±3° C.

The obtained slurry composition for a positive electrode was used to produce a positive electrode in the same way as in Example 1. A negative electrode, a separator, and a non-aqueous secondary battery were also produced in the same way as in Example 1, and various evaluations and measurements were performed. The results are shown in Table 1.

Example 3

A polymer γ2 was obtained by, in production of a polymer γ, changing the hydrogenation reaction conditions such that the iodine value was a value indicated in Table 1. With the exception of this point, various operations, measurements, and evaluations were performed in the same way as in Example 1. The results are shown in Table 1.

Example 4

Various operations, measurements, and evaluations were performed in the same way as in Example 1 with the exception that a polymer β2 produced as described below was used as a polymer β. The results are shown in Table 1.

<Production of Polymer β2>

A water dispersion of a polyacrylonitrile (PAN) copolymer (polymer β2) in which the proportional content of acrylonitrile units was 72 mass % was obtained in the same way as in Example 1 with the exception that additive amounts into the reactor B were set as 72 parts of acrylonitrile, 8 parts of acrylamide, 2 parts of methacrylic acid, and 18 parts of n-butyl acrylate. In addition, solvent exchange with NMP was performed in the same way as in Example 1 to obtain an NMP solution (solid content concentration: 8%) of the polymer β2.

Examples 5 and 6

Various operations, measurements, and evaluations were performed in the same way as in Example 1 with the exception that the amount of the plasticizer was changed as indicated in Table 1. The results are shown in Table 1.

Examples 7 to 9

Various operations, measurements, and evaluations were performed in the same way as in Example 1 with the exception that the type of plasticizer that was used was changed as indicated in Table 1. The results are shown in Table 1.

Example 10

Various operations, measurements, and evaluations were performed in the same way as in Example 1 with the exception that a component corresponding to a polymer γ was not used and that, in place thereof, the content (a) of the polymer α was changed as indicated in Table 1. The results are shown in Table 1.

Example 11

Various operations, measurements, and evaluations were performed in the same way as in Example 1 with the exception that a polymer β3 produced by using 1 part of methacrylamide instead of 1 part of acrylamide as an amide group-containing monomer was used as a polymer β. The results are shown in Table 1.

Example 12

Various operations, measurements, and evaluations were performed in the same way as in Example 1 with the exception that a polymer β4 that was produced such as to have a chemical composition indicated in Table 1, without using an amide group-containing monomer, was used as a polymer β. The results are shown in Table 1.

Example 13

Various operations, measurements, and evaluations were performed in the same way as in Example 1 with the exception that a polymer β5 that was produced such as to have a chemical composition indicated in Table 1, without using a (meth)acrylic acid ester monomer, was used as a polymer β. The results are shown in Table 1.

Comparative Example 1

Various operations, measurements, and evaluations were performed in the same way as in Example 1 with the exception that a polymer B1 that was produced such as to have a chemical composition indicated in Table 1 with a proportional content of acrylonitrile units as nitrile group-containing monomer units of 40 mass % was used instead of using a component corresponding to a polymer β. The results are shown in Table 1.

Comparative Example 2

Various operations, measurements, and evaluations were performed in the same way as in Example 1 with the exception that a component corresponding to a polymer α was not used and that the amounts of polymers β and γ were changed as indicated in Table 1. The results are shown in Table 1.

Comparative Example 3

A component corresponding to a plasticizer was not used. Moreover, the amounts of polymers α to γ were changed such that the total amount thereof was 2 parts relative to 97 parts of the electrode active material and such that the content ratios thereof were as indicated in Table 1. With the exception of these points, various operations, measurements, and evaluations were performed in the same way as in Example 1. The results are shown in Table 1.

Comparative Example 4

Various operations, measurements, and evaluations were performed in the same way as in Example 8 with the exception that PVdF was used instead of using a component corresponding to a polymer β. The results are shown in Table 1.

Comparative Example 5

Various operations, measurements, and evaluations were performed in the same way as in Example 1 with the exception that a polymer B2 that was produced such as to have a chemical composition indicated in Table 1 with a proportional content of acrylamide units as amide group-containing monomer units of 25 mass % was used instead of using a component corresponding to a polymer β. The results are shown in Table 1.

Comparative Example 6

Various operations, measurements, and evaluations were performed in the same way as in Example 1 with the exception that a polymer B3 that was produced such as to have a chemical composition indicated in Table 1 was used instead of using a component corresponding to a polymer β. The results are shown in Table 1.

Comparative Example 7

Various operations, measurements, and evaluations were performed in the same way as in Example 1 with the exception that a polymer B4 that was produced such as to have a chemical composition indicated in Table 1 was used instead of using a component corresponding to a polymer β. The results are shown in Table 1.

In Table 1, shown below:

"MMA" indicates methyl methacrylate;

"BA" indicates n-butyl acrylate;

"MAA" indicates methacrylic acid;

"AMA" indicates allyl methacrylate;

"AN" indicates acrylonitrile;

"AAm" indicates acrylamide;

"ST" indicates styrene;

"H-BD" indicates hydrogenated 1,3-butadiene unit; and

"CNT" indicates carbon nanotubes.

TABLE 1

| | | | Examples | | | | |
|---|---|---|---|---|---|---|---|
| | | | 1 | 2 | 3 | 4 | 5 |
| Binder component | Polymer α | (Meth)acrylic acid ester monomer unit: MMA/BA (mass %) | 55/39 | 55/39 | 55/39 | 55/39 | 55/39 |
| | | Ethylenically unsaturated acid monomer unit: MAA (mass %) | 5 | 5 | 5 | 5 | 5 |
| | | Cross-linkable monomer unit: AMA (mass %) | 1 | 1 | 1 | 1 | 1 |
| | Polymer β (or binder) | Type | β1 | β1 | β1 | β2 | β1 |
| | | Nitrile group-containing monomer unit | AN | AN | AN | AN | AN |
| | | Proportional content (mass %) | 92 | 92 | 92 | 72 | 92 |
| | | C1-C6 (meth)acrylic acid ester monomer unit | BA | BA | BA | BA | BA |
| | | Proportional content (mass %) | 5 | 5 | 5 | 18 | 5 |
| | | Amide group-containing monomer unit | AAm | AAm | AAm | AAm | AAm |
| | | Proportional content (mass %) | 1 | 1 | 1 | 8 | 1 |
| | | Ethylenically unsaturated acid monomer unit | MAA | MAA | MAA | MAA | MAA |
| | | Proportional content (mass %) | 2 | 2 | 2 | 2 | 2 |
| | | Weight-average molecular weight (—) | | | 1,100,000 | | |
| | Polymer γ (or binder) | Type | γ1 | γ1 | γ2 | γ1 | γ1 |
| | | Chemical composition | | | ST/AN/H-BD/MAA | | |
| | | Iodine value (g/100 g) | 50 | 50 | 16 | 50 | 50 |
| | | Weight-average molecular weight (—) | 300,000 | 300,000 | 300,000 | 300,000 | 300,000 |
| | Polymer α content ratio (a) | (Mass %; based on binder component content) | 19 | 19 | 19 | 19 | 19 |
| | Polymer β content ratio (b) | | 78 | 78 | 78 | 78 | 78 |
| | Polymer γ content ratio (c) | | 3 | 3 | 3 | 3 | 3 |
| | a/(a + b) × 100(%) | | 20 | 20 | 20 | 20 | 20 |
| | a/(a + c) × 100(%) | | 86 | 86 | 86 | 86 | 86 |
| | Amount of NMP-insoluble content in α and β (mass %) | | 40 | 40 | 40 | 40 | 40 |
| Active material | Type | | NMC | NMC | NMC | NMC | NMC |
| | Amount (parts by mass) | | 97 | 97 | 97 | 97 | 97 |
| Conductive material | Type | | CNT | CNT | CNT | CNT | CNT |
| | Amount (parts by mass) | | 1 | 1 | 1 | 1 | 1 |
| Binder + plasticizer | Parts by mass (total) | | 2 | 2 | 2 | 2 | 2 |
| Plasticizer | Type | | | | 2-Ethylhexyl diphenyl phosphate | | |
| | Molecular weight (—) | | 362.4 | 362.4 | 362.4 | 362.4 | 362.4 |
| | Decomposition potential (V) | | 4.7 | 4.7 | 4.7 | 4.7 | 4.7 |
| | Boiling point (° C.) | | 375 | 375 | 375 | 375 | 375 |
| | Amount (mass %) (based on binder component + plasticizer) | | 7.5 | 7.5 | 7.5 | 7.5 | 2.5 |

TABLE 1-continued

| | | | | | | |
|---|---|---|---|---|---|---|
| Slurry composition production method | | I | II | I | I | I |
| Evaluation | Electrode flexibility | A | A | B | A | A |
| | Electrode uniformity | A | A | A | A | A |
| | Electrode peel strength | A | A | A | B | A |
| | Secondary battery initial capacity | A | A | A | A | A |
| | Secondary battery rate characteristics | A | A | A | A | A |
| | Secondary battery cycle characteristics | A | A | A | B | A |

| | | | Examples | | | | |
|---|---|---|---|---|---|---|---|
| | | | 6 | 7 | 8 | 9 | 10 |
| Binder component | Polymer α | (Meth)acrylic acid ester monomer unit: MMA/BA (mass %) | 55/39 | 55/39 | 55/39 | 55/39 | 55/39 |
| | | Ethylenically unsaturated acid monomer unit: MAA (mass %) | 5 | 5 | 5 | 5 | 5 |
| | | Cross-linkable monomer unit: AMA (mass %) | 1 | 1 | 1 | 1 | 1 |
| | Polymer β (or binder) | Type | β1 | β1 | β1 | β1 | β1 |
| | | Nitrile group-containing monomer unit | AN | AN | AN | AN | AN |
| | | Proportional content (mass %) | 92 | 92 | 92 | 92 | 92 |
| | | C1-C6 (meth)acrylic acid ester monomer unit | BA | BA | BA | BA | BA |
| | | Proportional content (mass %) | 5 | 5 | 5 | 5 | 5 |
| | | Amide group-containing monomer unit | AAm | AAm | AAm | AAm | AAm |
| | | Proportional content (mass %) | 1 | 1 | 1 | 1 | 1 |
| | | Ethylenically unsaturated acid monomer unit | MAA | MAA | MAA | MAA | MAA |
| | | Proportional content (mass %) | 2 | 2 | 2 | 2 | 2 |
| | | Weight-average molecular weight (—) | 1,100,000 | | | | |
| | Polymer γ (or binder) | Type | γ1 | γ1 | γ1 | γ1 | — |
| | | Chemical composition | ST/AN/H-BD/MAA | | | | — |
| | | Iodine value (g/100 g) | 50 | 50 | 50 | 50 | — |
| | | Weight-average molecular weight (—) | 300,000 | 300,000 | 300,000 | 300,000 | — |
| | Polymer α content ratio (a) | (Mass %; based on binder component content) | 19 | 19 | 19 | 19 | 22 |
| | Polymer β content ratio (b) | | 78 | 78 | 78 | 78 | 78 |
| | Polymer γ content ratio (c) | | 3 | 3 | 3 | 3 | 0 |
| | a/(a + b) × 100(%) | | 20 | 20 | 20 | 20 | 22 |
| | a/(a + c) × 100(%) | | 86 | 86 | 86 | 86 | 100 |
| | Amount of NMP-insoluble content in α and β (mass %) | | 40 | 40 | 40 | 40 | 50 |
| Active material | Type | | NMC | NMC | NMC | NMC | NMC |
| | Amount (parts by mass) | | 97 | 97 | 97 | 97 | 97 |
| Conductive material | Type | | CNT | CNT | CNT | CNT | CNT |
| | Amount (parts by mass) | | 1 | 1 | 1 | 1 | 1 |
| Binder + plasticizer | Parts by mass (total) | | 2 | 2 | 2 | 2 | 2 |
| Plasticizer | Type | | 2-Ethylhexyl diphenyl phosphate | Tributyl citrate | Acetyl tributyl citrate | Epoxidized soybean oil | 2-Ethylhexyl diphenyl phosphate |
| | Molecular weight (—) | | 362.4 | 360.4 | 402.48 | — | 362.4 |
| | Decomposition potential (V) | | 4.7 | 4.9 | 4.7 | 4.6 | 4.7 |
| | Boiling point (° C.) | | 375 | 234 | 327 | — | 375 |
| | Amount (mass %) (based on binder component + plasticizer) | | 15 | 7.5 | 7.5 | 7.5 | 7.5 |
| Slurry composition production method | | | I | I | I | I | I |
| Evaluation | Electrode flexibility | | A | A | B | B | B |
| | Electrode uniformity | | A | A | A | B | B |
| | Electrode peel strength | | B | B | A | B | B |
| | Secondary battery initial capacity | | B | A | A | B | A |
| | Secondary battery rate characteristics | | B | A | A | B | A |
| | Secondary battery cycle characteristics | | B | A | A | B | A |

TABLE 1-continued

| | | | Examples | | | Comparative Examples |
|---|---|---|---|---|---|---|
| | | | 11 | 12 | 13 | 1 |
| Binder component | Polymer α | (Meth)acrylic acid ester monomer unit: MMA/BA (mass %) | 55/39 | 55/39 | 55/39 | 55/39 |
| | | Ethylenically unsaturated acid monomer unit: MAA (mass %) | 5 | 5 | 5 | 5 |
| | | Cross-linkable monomer unit: AMA (mass %) | 1 | 1 | 1 | 1 |
| | Polymer β (or binder) | Type | β3 | β4 | β5 | B1 |
| | | Nitrile group-containing monomer unit | AN | AN | AN | AN |
| | | Proportional content (mass %) | 92 | 92 | 94 | 40 |
| | | C1-C6 (meth)acrylic acid ester monomer unit | BA | BA | — | BA |
| | | Proportional content (mass %) | 5 | 5 | 0 | 50 |
| | | Amide group-containing monomer unit | MAAm | — | AAm | AAm |
| | | Proportional content (mass %) | 1 | — | 3 | 5 |
| | | Ethylenically unsaturated acid monomer unit | MAA | MAA | MAA | MAA |
| | | Proportional content (mass %) | 2 | 3 | 3 | 5 |
| | | Weight-average molecular weight (—) | | 1,100,000 | | — |
| | Polymer γ (or binder) | Type | γ1 | γ1 | γ1 | γ1 |
| | | Chemical composition | | ST/AN/H-BD/MAA | | |
| | | Iodine value (g/100 g) | 50 | 50 | 50 | 50 |
| | | Weight-average molecular weight (—) | 300,000 | 300,000 | 300,000 | 300,000 |
| | Polymer α content ratio (a) | (Mass %; based on binder component content) | 19 | 19 | 19 | 19 |
| | Polymer β content ratio (b) | | 78 | 78 | 78 | 78 |
| | Polymer γ content ratio (c) | | 3 | 3 | 3 | 3 |
| | a/(a + b) × 100(%) | | 20 | 20 | 20 | 20 |
| | a/(a + c) × 100(%) | | 86 | 86 | 86 | 86 |
| | Amount of NMP-insoluble content in α and β (mass %) | | 40 | 40 | 40 | — |
| Active material | Type | | NMC | NMC | NMC | NMC |
| | Amount (parts by mass) | | 97 | 97 | 97 | 97 |
| Conductive material | Type | | CNT | CNT | CNT | CNT |
| | Amount (parts by mass) | | 1 | 1 | 1 | 1 |
| Binder + plasticizer | Parts by mass (total) | | 2 | 2 | 2 | 2 |
| Plasticizer | Type | | | 2-Ethylhexyl diphenyl phosphate | | 2-Ethylhexyl diphenyl phosphate |
| | Molecular weight (—) | | 362.4 | 362.4 | 362.4 | 362.4 |
| | Decomposition potential (V) | | 4.7 | 4.7 | 4.7 | 4.7 |
| | Boiling point (° C.) | | 375 | 375 | 375 | 375 |
| | Amount (mass %) (based on binder component + plasticizer) | | 7.5 | 7.5 | 7.5 | 7.5 |
| Slurry composition production method | | | I | I | I | I |
| Evaluation | Electrode flexibility | | B | B | B | A |
| | Electrode uniformity | | A | A | A | D |
| | Electrode peel strength | | B | B | B | B |
| | Secondary battery initial capacity | | A | A | A | D |
| | Secondary battery rate characteristics | | A | A | A | D |
| | Secondary battery cycle characteristics | | A | A | A | D |

| | | | Comparative Examples | | | |
|---|---|---|---|---|---|---|
| | | | 2 | 3 | 4 | 5 |
| Binder component | Polymer α | (Meth)acrylic acid ester monomer unit: MMA/BA (mass %) | — | 55/39 | 55/39 | 55/39 |
| | | Ethylenically unsaturated acid monomer unit: MAA (mass %) | — | 5 | 5 | 5 |
| | | Cross-linkable monomer unit: AMA (mass %) | — | 1 | 1 | 1 |
| | Polymer β (or binder) | Type | β1 | β1 | PVdF | B2 |
| | | Nitrile group-containing monomer unit | AN | AN | — | AN |
| | | Proportional content (mass %) | 92 | 92 | | 75 |
| | | C1-C6 (meth)acrylic acid ester monomer unit | BA | BA | | — |
| | | Proportional content (mass %) | 5 | 5 | | — |
| | | Amide group-containing monomer unit | AAm | AAm | | AAm |

TABLE 1-continued

| | | | | | | |
|---|---|---|---|---|---|---|
| | | Proportional content (mass %) | 1 | 1 | | 25 |
| | | Ethylenically unsaturated acid monomer unit | MAA | MAA | | — |
| | | Proportional content (mass %) | 2 | 2 | | — |
| | | Weight-average molecular weight (—) | 1,100,000 | | | — |
| | Polymer γ (or binder) | Type | γ1 | γ1 | γ1 | γ1 |
| | | Chemical composition | ST/AN/H-BD/MAA | | | |
| | | Iodine value (g/100 g) | 50 | 50 | 50 | 50 |
| | | Weight-average molecular weight (—) | 300,000 | 300,000 | 300,000 | 300,000 |
| | Polymer α content ratio (a) | (Mass %; based on binder component content) | 0 | 19 | 19 | 19 |
| | Polymer β content ratio (b) | | 97 | 78 | 78 | 78 |
| | Polymer γ content ratio (c) | | 3 | 3 | 3 | 3 |
| | a/(a + b) × 100(%) | | 0 | 20 | 20 | 20 |
| | a/(a + c) × 100(%) | | 0 | 86 | 86 | 86 |
| | Amount of NMP-insoluble content in α and β (mass %) | | 0 | 40 | — | — |
| Active material | Type | | NMC | NMC | NMC | NMC |
| | Amount (parts by mass) | | 97 | 97 | 97 | 97 |
| Conductive material | Type | | CNT | CNT | CNT | CNT |
| | Amount (parts by mass) | | 1 | 1 | 1 | 1 |
| Binder + plasticizer | Parts by mass (total) | | 2 | 2 | 2 | 2 |
| Plasticizer | Type | | 2-Ethylhexyl diphenyl phosphate | — | Acetyl tributyl citrate | 2-Ethylhexyl diphenyl phosphate |
| | Molecular weight (—) | | 362.4 | — | 402.48 | 362.4 |
| | Decomposition potential (V) | | 4.7 | — | 4.7 | 4.7 |
| | Boiling point (° C.) | | 375 | — | 327 | 375 |
| | Amount (mass %) (based on binder component + plasticizer) | | 7.5 | 0 | 7.5 | 7.5 |
| Slurry composition production method | | | I | I | I | I |
| Evaluation | Electrode flexibility | | D | D | A | A |
| | Electrode uniformity | | B | C | A | C |
| | Electrode peel strength | | A | A | A | C |
| | Secondary battery initial capacity | | A | A | A | D |
| | Secondary battery rate characteristics | | A | A | C | D |
| | Secondary battery cycle characteristics | | B | B | C | D |

| | | | Comparative Examples | |
|---|---|---|---|---|
| | | | 6 | 7 |
| Binder component | Polymer α | (Meth)acrylic acid ester monomer unit: MMA/BA (mass %) | 55/39 | 55/39 |
| | | Ethylenically unsaturated acid monomer unit: MAA (mass %) | 5 | 5 |
| | | Cross-linkable monomer unit: AMA (mass %) | 1 | 1 |
| | Polymer β (or binder) | Type | B3 | B4 |
| | | Nitrile group-containing monomer unit | AN | AN |
| | | Proportional content (mass %) | 97 | 95 |
| | | C1-C6 (meth)acrylic acid ester monomer unit | None | 2EHA |
| | | Proportional content (mass %) | 0 | 5 |
| | | Amide group-containing monomer unit | None | — |
| | | Proportional content (mass %) | 0 | — |
| | | Ethylenically unsaturated acid monomer unit | MAA | — |
| | | Proportional content (mass %) | 3 | — |
| | | Weight-average molecular weight (—) | — | — |
| | Polymer γ (or binder) | Type | γ1 | γ1 |
| | | Chemical composition | ST/AN/H-BD/MAA | |
| | | Iodine value (g/100 g) | 50 | 50 |
| | | Weight-average molecular weight (—) | 300,000 | 300,000 |
| | Polymer α content ratio (a) | (Mass %; based on binder component content) | 19 | 19 |
| | Polymer β content ratio (b) | | 78 | 78 |

TABLE 1-continued

| | | | |
|---|---|---|---|
| | Polymer γ content ratio (c) | 3 | 3 |
| | a/(a + b) × 100(%) | 20 | 20 |
| | a/(a + c) × 100(%) | 86 | 86 |
| | Amount of NMP-insoluble content in α and β (mass %) | — | — |
| Active material | Type | NMC | NMC |
| | Amount (parts by mass) | 97 | 97 |
| Conductive material | Type | CNT | CNT |
| | Amount (parts by mass) | 1 | 1 |
| Binder + plasticizer | Parts by mass (total) | 2 | 2 |
| Plasticizer | Type | 2-Ethylhexyl diphenyl phosphate | |
| | Molecular weight (—) | 362.4 | 362.4 |
| | Decomposition potential (V) | 4.7 | 4.7 |
| | Boiling point (° C.) | 375 | 375 |
| | Amount (mass %) (based on binder component + plasticizer) | 7.5 | 7.5 |
| Slurry composition production method | | I | I |
| Evaluation | Electrode flexibility | D | B |
| | Electrode uniformity | B | B |
| | Electrode peel strength | C | C |
| | Secondary battery initial capacity | A | B |
| | Secondary battery rate characteristics | A | C |
| | Secondary battery cycle characteristics | B | B |

It can be seen from Table 1 that it was possible to simultaneously achieve, to high levels, both the formation of an electrode having excellent flexibility and uniformity and the enhancement of rate characteristics and cycle characteristics of a secondary battery including the obtained electrode in Examples 1 to 13 in which a binder composition containing the specific polymers α and 13 was used. It can also be seen from Table 1 that it was not possible to simultaneously achieve, to high levels, both the formation of an electrode having excellent flexibility and uniformity and the enhancement of rate characteristics and cycle characteristics of a secondary battery including the obtained electrode in Comparative Examples 1, 2, and 4 to 7 in which either the polymer α or the polymer β was absent and in Comparative Example 3 in which a plasticizer was absent.

INDUSTRIAL APPLICABILITY

According to the present disclosure, it is possible to provide a binder composition for a non-aqueous secondary battery electrode and a slurry composition for a non-aqueous secondary battery electrode with which it is possible to simultaneously achieve, to high levels, both the formation of an electrode having excellent flexibility and uniformity and the enhancement of rate characteristics and cycle characteristics of a secondary battery including the obtained electrode.

Moreover, according to the present disclosure, it is possible to provide an electrode for a non-aqueous secondary battery that has excellent flexibility and uniformity and that can enhance the rate characteristics and cycle characteristics of a secondary battery.

Furthermore, according to the present disclosure, it is possible to provide a non-aqueous secondary battery that has excellent rate characteristics and cycle characteristics.

The invention claimed is:

1. A binder composition for a non-aqueous secondary battery electrode comprising: a polymer α and a polymer β as a binder component; a plasticizer; and an organic solvent, wherein the polymer α is an insoluble polymer that includes a (meth)acrylic acid ester monomer unit and an ethylenically unsaturated acid monomer unit, and the polymer β is a highly soluble polymer that includes a nitrile group-containing monomer unit, selected from acrylonitrile unit and methacrylonitrile unit, and both of an amide group-containing monomer unit, selected from acrylamide and methacrylamide, and a (meth) acrylic acid ester monomer unit having a linear alkyl chain carbon number of not less than 1 and not more than 6, wherein a proportional content of the nitrile group-containing monomer unit is not less than 70 mass % and not more than 95 mass %, total proportional content of the amide group-containing monomer unit and the (meth)acrylic acid ester monomer unit is not less than 0.1 mass % and not more than 20 mass %, and a proportional content of the amide group-containing monomer unit is not less than 0.5 mass % and not more than 8 mass % when all monomer units forming the polymer β are taken to be 100 mass %, in total.

2. The binder composition for a non-aqueous secondary battery electrode according to claim 1, wherein, when a total mass of the binder component is taken to be 100 mass %, a content ratio (a) of the polymer α is not less than 5 mass % and not more than 60 mass % and a content ratio (b) of the polymer β is not less than 20 mass % and not more than 94 mass %.

3. The binder composition for a non-aqueous secondary battery electrode according to claim 2, wherein the polymer α and the polymer β are polymers satisfying a condition that, in a situation in which an N-methyl-2-pyrrolidone mixture of 8 mass % in solid content concentration is produced such as to contain, as solid content, the polymer α in the content ratio (a) and the polymer β in the content ratio (b), a proportion of insoluble content in the mixture is not less than 30 mass % and not more than 80 mass %.

4. The binder composition for a non-aqueous secondary battery electrode according to claim 1, wherein a content ratio of the plasticizer is not less than 0.1 mass % and not more than 30 mass % when a total mass of the plasticizer and the binder component is taken to be 100 mass %.

5. The binder composition for a non-aqueous secondary battery electrode according to claim 1, wherein the plasticizer has a molecular weight of 1,000 or less g/mol and a decomposition potential of 3.5 V or higher.

6. The binder composition for a non-aqueous secondary battery electrode according to claim 1, further comprising, as the binder component, a polymer γ that is a highly soluble polymer having an iodine value of not less than 5 g/100 g and not more than 100 g/100 g.

7. The binder composition for a non-aqueous secondary battery electrode according to claim 6, wherein a content ratio (c) of the polymer γ is not less than 0.1 mass % and not more than 50 mass % when a content of the binder component is taken to be 100 mass %.

8. A slurry composition for a non-aqueous secondary battery electrode comprising: an electrode active material; a conductive material; and the binder composition for a non-aqueous secondary battery electrode according to claim 1.

9. The slurry composition for a non-aqueous secondary battery electrode according to claim 8, wherein the conductive material includes one or more carbon nanotubes.

10. An electrode for a non-aqueous secondary battery comprising an electrode mixed material layer containing: a polymer α and a polymer β as a binder component; a plasticizer; an electrode active material; and a conductive material, wherein the polymer α is a particulate polymer that includes a (meth)acrylic acid ester monomer unit and an ethylenically unsaturated acid monomer unit, and the polymer β is a highly soluble polymer that includes a nitrile group-containing monomer unit, selected from acrylonitrile unit and methacrylonitrile unit, and both of an amide group-containing monomer unit, selected from acrylamide and methacrylamide, and a (meth) acrylic acid ester monomer unit having a linear chain carbon number of not less than 1 and not more than 6, wherein a proportional content of the nitrile group-containing monomer unit is not less than 70 mass % and not more than 95 mass %, total proportional content of the amide group-containing monomer unit and the (meth)acrylic acid ester monomer unit is not less than 0.1 mass % and not more than 20 mass %, and a proportional content of the amide group-containing monomer unit is not less than 0.5 mass % and not more than 8 mass % when all monomer units forming the polymer J are taken to be 100 mass %, in total.

11. The electrode for a non-aqueous secondary battery according to claim 10, further comprising, as the binder component, a polymer γ that is a highly soluble polymer having an iodine value of not less than 5 g/100 g and not more than 100 g/100 g.

12. An electrode for a non-aqueous secondary battery comprising an electrode mixed material layer formed using the slurry composition for a non-aqueous secondary battery electrode according to claim 8.

13. A non-aqueous secondary battery comprising the electrode for a non-aqueous secondary battery according to claim 10.

* * * * *